(12) United States Patent
Wang et al.

(10) Patent No.: US 7,184,489 B2
(45) Date of Patent: Feb. 27, 2007

(54) OPTIMIZATION TECHNIQUE FOR LAYERED MODULATION

(75) Inventors: Weizheng Wang, Rancho Palos Verdes, CA (US); Guangcai Zhou, Reseda, CA (US); Tung-Sheng Lin, Claremont, CA (US); Ernest C. Chen, San Pedro, CA (US); Joseph Santoru, Agoura Hills, CA (US); William C. Lindsey, Pasadena, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 411 days.

(21) Appl. No.: 10/693,140

(22) Filed: Oct. 24, 2003

(65) Prior Publication Data
US 2004/0136469 A1    Jul. 15, 2004

Related U.S. Application Data

(63) Continuation-in-part of application No. 09/844,401, filed on Apr. 27, 2001.

(60) Provisional application No. 60/421,293, filed on Oct. 25, 2002.

(51) Int. Cl.
   *H04L 27/04*    (2006.01)
(52) U.S. Cl. .................................................. 375/295
(58) Field of Classification Search ............... 375/259, 375/260, 295, 297
   See application file for complete search history.

(56) References Cited

U.S. PATENT DOCUMENTS

| | | | |
|---|---|---|---|
| 3,076,180 A | 1/1963 | Havens et al. |
| 3,383,598 A | 5/1968 | Sanders |
| 3,878,468 A | 4/1975 | Falconer et al. |
| 3,879,664 A | 4/1975 | Monsen |
| 3,974,449 A | 8/1976 | Falconer |
| 4,039,961 A | 8/1977 | Ishio et al. |
| 4,068,186 A | 1/1978 | Sato et al. |

(Continued)

FOREIGN PATENT DOCUMENTS

DE    3642213    12/1986

(Continued)

OTHER PUBLICATIONS

Fang, T. et al.; "Fourth-Power Law Clock Recovery with Prefiltering", Proceedings of the International Conference on Communications (ICC), Geneva, May 23-26, 1993, New York, IEEE, US, vol. 3, May 23, 1993, pp. 811-815, XP010137089, ISBN:0-7803-0950-2, Section I, Introduction.

(Continued)

*Primary Examiner*—Emmanuel Bayard
(74) *Attorney, Agent, or Firm*—Georgann S. Grunebach

(57) ABSTRACT

A method and apparatus for optimizing a system for transmitting a layered modulated signal is disclosed. The method comprises the steps of defining the system in terms of a set of system parameters, including an optimal power separation S between a power of a first modulation layer and a power of a second modulation layer and a required system carrier-to-noise ratio ($CNR_S$), determining an optimal power separation S to minimize the error rate of a lower layer modulated signal $BER_L$, and selecting the remaining system parameters in the set of system parameters using the determined optimal power separation S.

19 Claims, 27 Drawing Sheets

U.S. PATENT DOCUMENTS

| | | | |
|---|---|---|---|
| 4,213,095 A | 7/1980 | Falconer | |
| 4,253,184 A | 2/1981 | Gitlin et al. | |
| 4,283,684 A | 8/1981 | Satoh | |
| 4,384,355 A | 5/1983 | Werner | |
| RE31,351 E | 8/1983 | Falconer | |
| 4,416,015 A | 11/1983 | Gitlin | |
| 4,500,984 A | 2/1985 | Shimbo et al. | |
| 4,519,084 A | 5/1985 | Langseth | |
| 4,594,725 A | 6/1986 | Desperben et al. | |
| 4,628,507 A | 12/1986 | Otani | |
| 4,637,017 A | 1/1987 | Assal et al. | |
| 4,647,873 A | 3/1987 | Beckner et al. | |
| 4,654,863 A | 3/1987 | Belfield et al. | |
| 4,670,789 A | 6/1987 | Plume | |
| 4,709,374 A | 11/1987 | Farrow | |
| 4,800,573 A | 1/1989 | Cupo | |
| 4,835,790 A | 5/1989 | Yoshida et al. | |
| 4,847,864 A | 7/1989 | Cupo | |
| 4,860,315 A | 8/1989 | Hosoda et al. | |
| 4,878,030 A | 10/1989 | Vincze | |
| 4,896,369 A | 1/1990 | Adams et al. | |
| 4,918,708 A | 4/1990 | Pottinger et al. | |
| 4,993,047 A | 2/1991 | Moffat et al. | |
| 5,088,110 A | 2/1992 | Bonnerot et al. | |
| 5,111,155 A | 5/1992 | Keate et al. | |
| 5,121,414 A | 6/1992 | Levine et al. | |
| 5,199,047 A | 3/1993 | Koch | |
| 5,221,908 A | 6/1993 | Katz et al. | |
| 5,229,765 A | 7/1993 | Gardner | |
| 5,233,632 A | 8/1993 | Baum et al. | |
| 5,285,480 A | 2/1994 | Chennakeshu et al. | |
| 5,317,599 A | 5/1994 | Obata | |
| 5,329,311 A | 7/1994 | Ward et al. | |
| 5,430,770 A | 7/1995 | Abbey | |
| 5,450,623 A | 9/1995 | Yokoyama et al. | |
| 5,467,197 A | 11/1995 | Hoff | |
| 5,493,307 A | 2/1996 | Tsujimoto | |
| 5,555,257 A | 9/1996 | Dent | |
| 5,557,067 A | 9/1996 | Messelhi | |
| 5,577,067 A | 11/1996 | Zimmerman | |
| 5,577,087 A | 11/1996 | Furuya | |
| 5,579,344 A | 11/1996 | Namekata | |
| 5,581,229 A | 12/1996 | Hunt | |
| 5,603,084 A | 2/1997 | Henry et al. | |
| 5,606,286 A | 2/1997 | Bains | |
| 5,625,640 A | 4/1997 | Palmer et al. | |
| 5,642,358 A | 6/1997 | Dent | |
| 5,648,955 A | 7/1997 | Jensen et al. | |
| 5,732,113 A | 3/1998 | Schmidl et al. | |
| 5,793,818 A | 8/1998 | Claydon et al. | |
| 5,815,531 A | 9/1998 | Dent | |
| 5,819,157 A | 10/1998 | Ben-Efraim et al. | |
| 5,828,710 A | 10/1998 | Beale | |
| 5,848,060 A | 12/1998 | Dent | |
| 5,870,443 A | 2/1999 | Rahnema | |
| 5,940,025 A | 8/1999 | Koehnke et al. | |
| 5,956,373 A | 9/1999 | Goldston et al. | |
| 5,960,040 A | 9/1999 | Cai et al. | |
| 5,963,845 A | 10/1999 | Floury et al. | |
| 5,966,048 A | 10/1999 | Thompson | |
| 5,966,186 A | 10/1999 | Shigihara et al. | |
| 5,966,412 A | 10/1999 | Ramaswamy | |
| 5,970,098 A | 10/1999 | Herzberg | |
| 5,987,068 A | 11/1999 | Cassia et al. | |
| 5,995,832 A | 11/1999 | Mallinckrodt | |
| 5,999,793 A | 12/1999 | Ben-Efraim et al. | |
| 6,008,692 A | 12/1999 | Escartin | |
| 6,018,556 A | 1/2000 | Janesch et al. | |
| 6,021,159 A | 2/2000 | Nakagawa | |
| 6,028,894 A | 2/2000 | Oishi et al. | |
| 6,032,026 A | 2/2000 | Seki et al. | |
| 6,034,952 A | 3/2000 | Dohi et al. | |
| 6,052,586 A | 4/2000 | Karabinis | |
| 6,055,278 A | 4/2000 | Ho et al. | |
| 6,061,393 A | 5/2000 | Tsui et al. | |
| 6,084,919 A | 7/2000 | Kleider et al. | |
| 6,108,374 A | 8/2000 | Balachandran et al. | |
| 6,125,148 A | 9/2000 | Frodigh et al. | |
| 6,128,357 A | 10/2000 | Lu et al. | |
| 6,131,013 A | 10/2000 | Bergstrom et al. | |
| 6,140,809 A | 10/2000 | Doi | |
| 6,141,534 A | 10/2000 | Snell et al. | |
| 6,144,708 A | 11/2000 | Maruyama | |
| 6,166,601 A | 12/2000 | Shalom et al. | |
| 6,178,158 B1 * | 1/2001 | Suzuki et al. | 370/203 |
| 6,188,717 B1 | 2/2001 | Kaiser et al. | |
| 6,212,360 B1 | 4/2001 | Fleming et al. | |
| 6,219,095 B1 | 4/2001 | Zhang et al. | |
| 6,249,180 B1 | 6/2001 | Maalej et al. | |
| 6,266,534 B1 | 7/2001 | Raith et al. | |
| 6,272,679 B1 | 8/2001 | Norin | |
| 6,275,678 B1 | 8/2001 | Bethscheider et al. | |
| 6,297,691 B1 | 10/2001 | Anderson et al. | |
| 6,304,594 B1 | 10/2001 | Salinger | |
| 6,307,435 B1 | 10/2001 | Nguyen et al. | |
| 6,320,919 B1 | 11/2001 | Khayrallah et al. | |
| 6,325,332 B1 | 12/2001 | Cellier et al. | |
| 6,330,336 B1 | 12/2001 | Kasama | |
| 6,333,924 B1 | 12/2001 | Porcelli et al. | |
| 6,366,309 B1 | 4/2002 | Siegle | |
| 6,369,648 B1 | 4/2002 | Kirkman | |
| 6,389,002 B1 * | 5/2002 | Schilling | 370/342 |
| 6,411,659 B1 | 6/2002 | Liu et al. | |
| 6,411,797 B1 | 6/2002 | Estinto | |
| 6,426,822 B1 | 7/2002 | Winter et al. | |
| 6,429,740 B1 | 8/2002 | Nguyen et al. | |
| 6,433,835 B1 | 8/2002 | Hartson et al. | |
| 6,477,398 B1 | 11/2002 | Mills | |
| 6,501,804 B1 | 12/2002 | Rudolph et al. | |
| 6,515,713 B1 | 2/2003 | Nam | |
| 6,535,497 B1 | 3/2003 | Raith | |
| 6,535,801 B1 | 3/2003 | Geier et al. | |
| 6,574,235 B1 | 6/2003 | Arslan et al. | |
| 6,597,750 B1 | 7/2003 | Knutson et al. | |
| 6,718,184 B1 | 4/2004 | Aiken et al. | |
| 6,731,700 B1 | 5/2004 | Yakhnich et al. | |
| 6,741,662 B1 | 5/2004 | Francos et al. | |
| 6,745,050 B1 | 6/2004 | Forsythe et al. | |
| 6,775,521 B1 | 8/2004 | Chen | |
| 6,892,068 B2 | 5/2005 | Karabinis et al. | |
| 6,934,314 B2 | 8/2005 | Harles et al. | |
| 6,970,496 B1 | 11/2005 | Ben-Bassat et al. | |
| 2001/0012322 A1 | 8/2001 | Nagaoka et al. | |
| 2001/0024479 A1 | 9/2001 | Samarasooriya | |
| 2002/0006795 A1 | 1/2002 | Norin et al. | |
| 2002/0071506 A1 | 6/2002 | Lindquist et al. | |
| 2002/0158619 A1 | 10/2002 | Chen | |
| 2002/0176516 A1 | 11/2002 | Jeske et al. | |
| 2003/0002471 A1 | 1/2003 | Crawford et al. | |
| 2003/0138037 A1 | 7/2003 | Kaku et al. | |
| 2004/0110467 A1 | 6/2004 | Wang | |
| 2004/0146296 A1 * | 7/2004 | Gerszberg et al. | 398/12 |
| 2005/0008100 A1 | 1/2005 | Chen | |
| 2006/0056541 A1 | 3/2006 | Chen et al. | |

FOREIGN PATENT DOCUMENTS

| | | |
|---|---|---|
| EP | 0222076 | 8/1986 |
| EP | 0238822 | 9/1987 |
| EP | 0356096 | 2/1990 |
| EP | 0929164 | 7/1999 |
| FR | 2696295 | 4/1994 |
| JP | 2-5631 | 1/1990 |
| JP | 2-95033 | 4/1990 |

| | | |
|---|---|---|
| JP | 03139027 | 6/1991 |
| JP | 5-41683 | 2/1993 |
| JP | 5-114878 | 5/1993 |
| JP | 5-252084 | 9/1993 |
| JP | 07-038615 | 2/1995 |
| WO | WO 99/20001 | 4/1999 |
| WO | WO 02/073817 | 9/2002 |
| WO | WO 2005/074171 | 8/2005 |
| WO | WO 2005/086444 | 9/2005 |

OTHER PUBLICATIONS

Janssen, G.J.M; Slimane, S.B.: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.

Slimane, S.B.; Janssen, G.J.M.: "Power Optimization of M-PSK Cochannel Signals for a Narrowband Multiuser Detector", 2001 IEEE Pacific Rim Conference on Communications, Computer and Signal Processing, Victoria, B.C., Canada, Aug. 26-28, 2001, XP010560334.

Soong, A.C.K.; Krzymien, W.A.: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP010159490.

Arslan, H; Molnar, K: "Iterative Co-channel Interference Cancellation in Narrowband Mobile Radio Systems", Emerging Technologies Symposium: Broadband, Wireless Internet Access, 2000 IEEE Apr. 10-11, 2000, Piscataway, New Jersey, US, XP010538900.

Mazzini, Gianluca: "Power Division Multiple Access", Universal Personal Communications, 1998, ICUPC 1998, IEEE 1998, International Conference on Florence, Italy, Oct. 5-9, 1998, New York, NY, US, IEEE, US Oct. 5, 1998, pp. 543-546, XP010314962 ISBN: 0-7803-5106-1.

Saleh, A.A.M. et al.: "Adaptive Linearization of Power Amplifiers in Digital Radio Systems", Bell System Technical Journal, American Telephone and Telegraph Co., New York, US, vol. 62, No. 4, Part 1, Apr. 1, 1983, pp. 1019-1033, XP002028354.

Ramchandran, Kannan et al.: Multiresolution Broadcast for Digital HDTV Using Joint Source/Channel Coding, IEEE, vol. 11, No. 1, Jan. 1993, pp. 6-22.

Meyr, Heinrich et al.; "Digital Communication Receivers—Synchronization, Channel Estimation, and Signal Processing"; John Wiley & Sons, Inc.; 1998; pp. 212-213 and 217-218; XP 002364874.

Meyr, Heinrich et al.; "Digital Communication Receivers—Synchronization, Channel Estimation, and Signal Processing"; John Wiley & Sons, Inc.; 1998; pp. 610-612; XP 002364876.

Wolcott, Ted J. et al.; "Uplink-Noise Limited Satellite Channels"; IEEE 1995; pp. 717-721; XP-00580915.

Seskar, Ivan et al.; "Implementation Aspects for Successive Interface Cancellation in DS/CDMA Systems"; Wireless Networks; 1998; pp. 447-452.

Earth Station Technology; 1986; pp. 404-412; XP-002248387.

Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.

* cited by examiner

OPTIMIZATION TECHNIQUE FOR LAYERED MODULATION

CROSS-REFERENCE TO RELATED APPLICATIONS

This application claims benefit of U.S. Provisional Patent Application No. 60/421,293, entitled "AN OPTIMIZATION TECHNIQUE FOR LAYERED MODULATION," by Weizheng Wang, Guangcai Zhou, Tung-Sheng Lin, Ernest C. Chen, Joseph Santoru, and William C. Lindsey, filed Oct. 25, 2002, which application is hereby incorporated by reference herein.

This application is also a continuation-in-part of the following co-pending and commonly assigned patent application(s), all of which applications are incorporated by reference herein:

Utility application Ser. No. 09/844,401, filed Apr. 27, 2001, by Ernest C. Chen, entitled "LAYERED MODULATION FOR DIGITAL SIGNALS,"

BACKGROUND OF THE INVENTION

1. Field of the Invention

The present invention relates to systems and methods for transmitting data, and in particular to a system and method for optimizing a system for transmitting a layered modulation signal.

2. Description of the Related Art

Digital signal communication systems have been used in various fields, including digital TV signal transmission, either terrestrial or satellite. As the various digital signal communication systems and services evolve, there is a burgeoning demand for increased data throughput and added services. However, it is more difficult to implement either improvement in old systems and new services when it is necessary to replace existing legacy hardware, such as transmitters and receivers. New systems and services are advantaged when they can utilize existing legacy hardware. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate conventional 8PSK or 16QAM signals. As a result, legacy customers with QPSK receivers must upgrade their receivers in order to continue to receive any signals transmitted with an 8PSK or 16QAM modulation.

It is advantageous for systems and methods of transmitting signals to accommodate enhanced and increased data throughput without requiring additional frequency. In addition, it is advantageous for enhanced and increased throughput signals for new receivers to be backwards compatible with legacy receivers. There is further an advantage for systems and methods which allow transmission signals to be upgraded from a source separate from the legacy transmitter.

It has been proposed that a layered modulation signal, transmitting non-coherently both upper and lower layer signals, can be employed to meet these needs. Such layered modulation systems allow higher information throughput with backwards compatibility. However, even when backward compatibility is not required (such as with an entirely new system), layered modulation can still be advantageous because it requires a TWTA peak power significantly lower than that for a conventional 8PSK or 16QAM modulation format for a given throughput.

While layered modulation systems allow higher information throughput with backwards capability, it is still imperative to maximize throughput of the layered system within the error rate and power constraints of the system. To accomplish this goal, it is necessary to identify key system parameters that drive overall system performance, and use those requirements for those parameters that maximize system performance within design constraints.

Accordingly, there is a need for a method for designing a layered modulation system to maximize achieved performance. The present invention meets this need and provides further advantages as detailed hereafter.

SUMMARY OF THE INVENTION

To address the requirements described above, the present invention discloses a method and apparatus for optimizing a system for transmitting a layered modulated signal. The method comprises the steps of defining the system in terms of a set of system parameters, including an optimal power separation S between a power of a first modulation layer and a power of a second modulation layer and a required system carrier-to-noise ratio ($CNR_S$), determining an optimal power separation S to minimize the error rate of a lower layer modulated signal $BER_L$, and selecting the remaining system parameters in the set of system parameters using the determined optimal power separation S.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Video Distribution System

Figure 1:
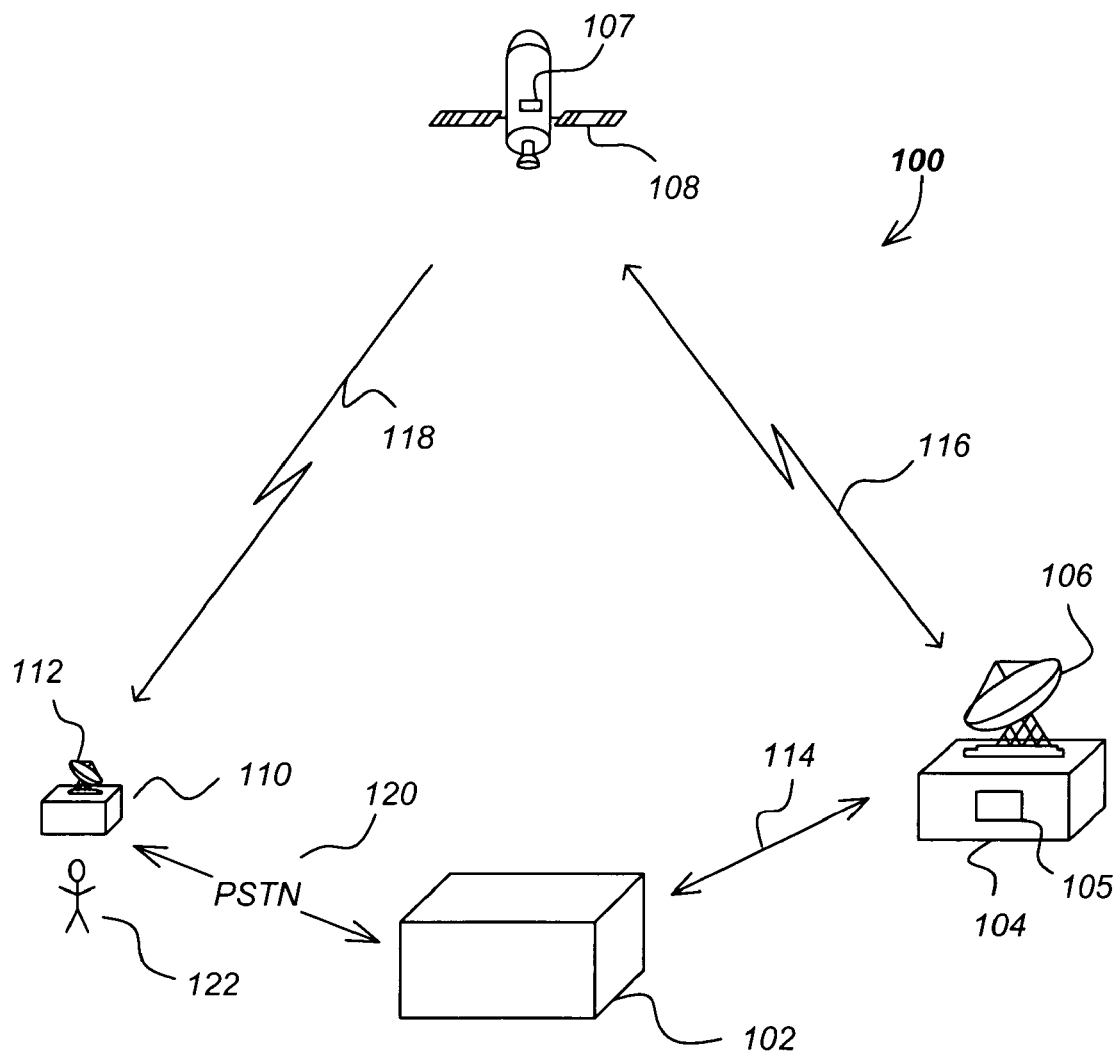
FIG. 1 is a diagram illustrating an overview of a single satellite video distribution system.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. video programs, audio programs and data) to the uplink center 104 and coordinates with the subscriber receiver stations 110 to offer, for example, pay-per-view (PPV) program services, including billing and associated decryption of video programs.

The uplink center 104 receives program material and program control information from the control center 102, and using an uplink antenna 106 and transmitter 105, transmits the program material and program control information to the satellite 108. The satellite receives and processes this information, and transmits the video programs and control information to the subscriber receiver station 110 via downlink 118 using transmitter 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite-based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well.

Uplink Configuration

Figure 2:
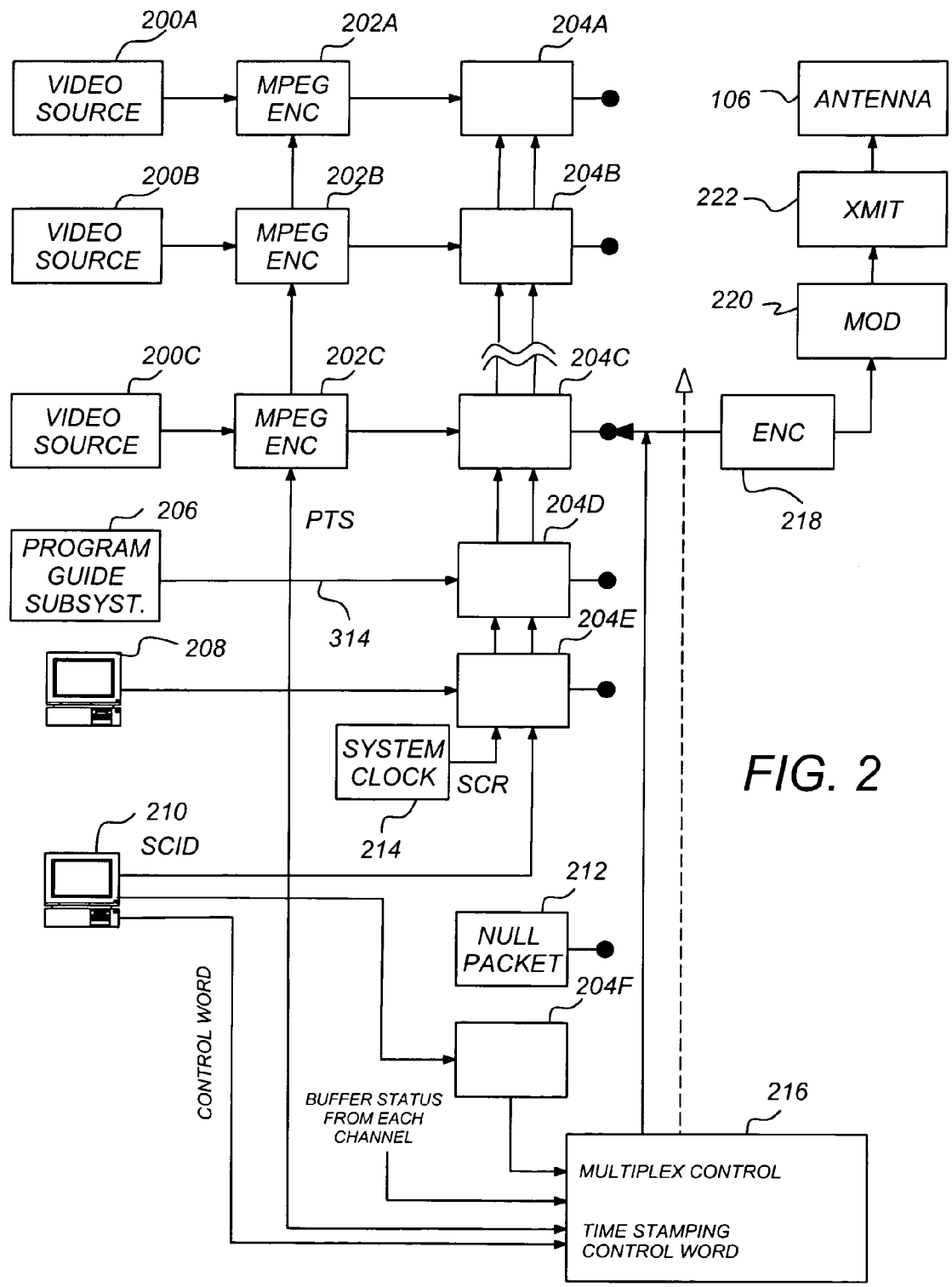
FIG. 2 is a block diagram showing a typical uplink configuration for a single satellite transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), a data channel from a program guide subsystem 206 and computer data information from a computer data source 208.

The video channels are provided by a program source of video material 200A–200C (collectively referred to hereinafter as video source(s) 200). The data from each video program source 200 is provided to an encoder 202A–202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A–204F (collectively referred to hereinafter as packetizer(s) 204) associated with each source 200.

The data packets are assembled using a reference from the system clock 214 (SCR), and from the conditional access manager 210, which provides the SCID to the packetizers 204 for use in generating the data packets. These data packets are then multiplexed into serial data and transmitted.

Broadcast Data Stream Format and Protocol

Figure 3A:
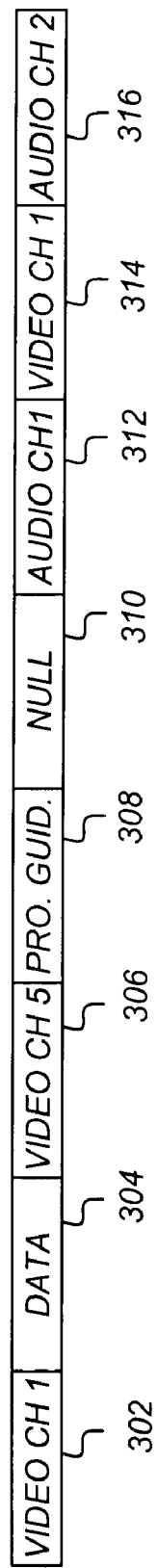
FIG. 3A is a diagram of a representative data stream.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 208. The next packet segment 306 comprises information from video channel 5 (from one of the video program sources 200). The next packet segment 308 comprises program guide information such as the information provided by the program guide subsystem 206. As shown in FIG. 3A, null packets 310 created by the null packet module 310 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 500 receives these signals, and using the SCID, reassembles the packets to regenerate the program material for each of the channels.

Figure 3B:
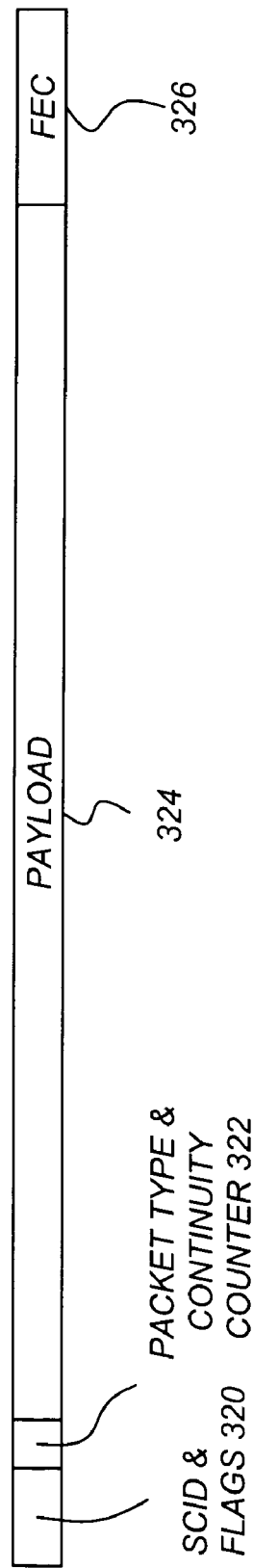
FIG. 3B is a diagram of a representative data packet.

FIG. 3B is a diagram of a data packet. Each data packet (e.g. 302–316) is 130 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control other features. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which in the cases of packets 302 or 306 is a portion of the video program provided by the video program source 200. The final packet segment 326 is data required to perform forward error correction.

Figure 4:
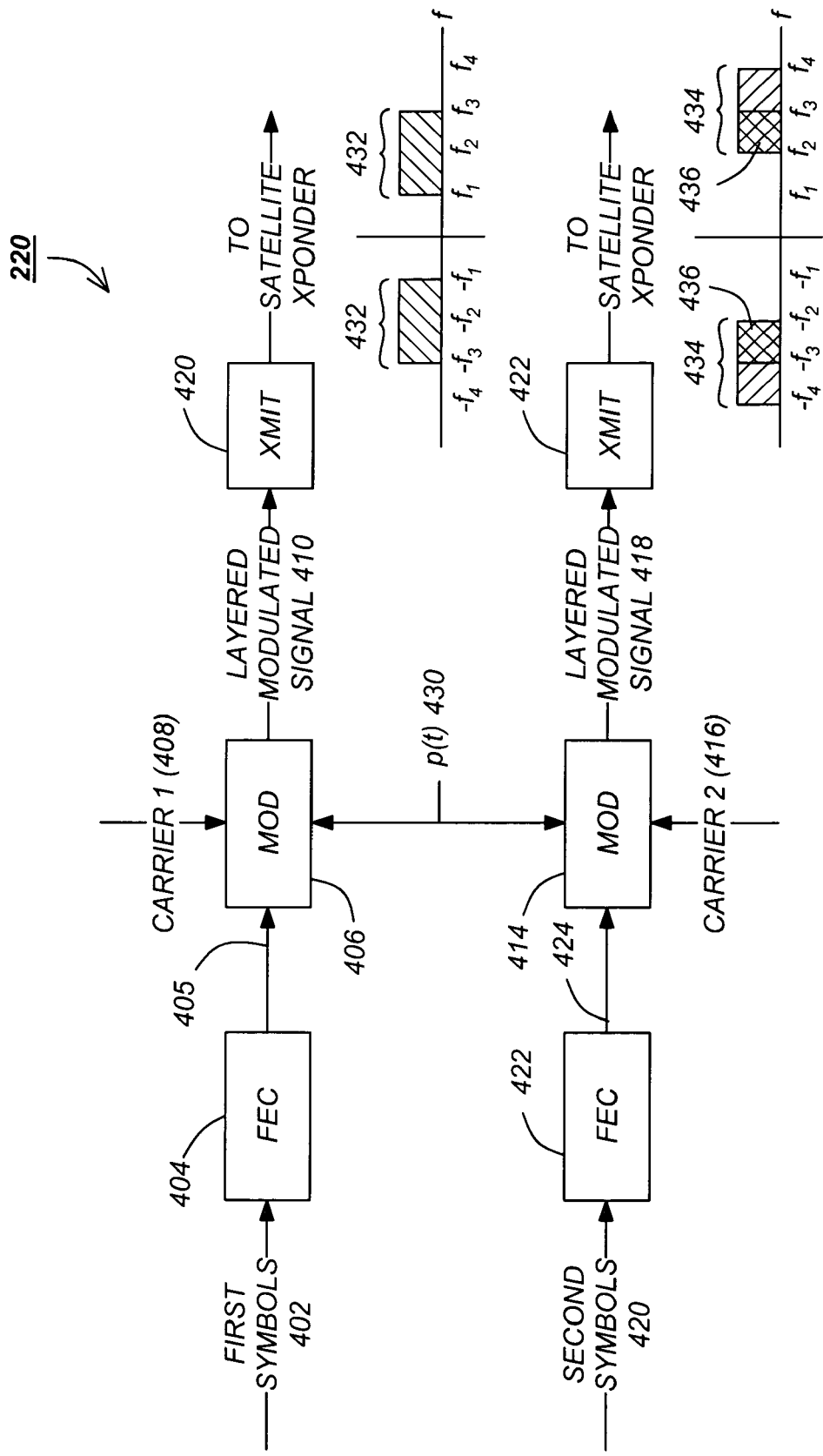
FIG. 4 is a block diagram showing one embodiment of the modulator.

FIG. 4 is a block diagram showing one embodiment of the modulator 220. The modulator 220 optionally comprises a forward error correction (FEC) encoder 404 which accepts the first signal symbols 402 and adds redundant information that are used to reduce transmission errors. The coded symbols 405 are modulated by modulator 406 according to a first carrier 408 to produce an upper layer modulated signal 410. Second symbols 420 are likewise provided to an optional second FEC encoder 422 to produce coded second symbols 422. The coded second symbols 422 are provided to a second modulator 414, which modulates the coded second signals according to a second carrier 416 to produce a lower layer modulated signal 418. The resulting signals are then transmitted by one or more transmitters 420, 422. The upper layer modulated signal 410 and the lower layer modulated signal 418 are therefore uncorrelated, and the frequency range used to transmit each layer can substantially or completely overlap the frequency spectrum used to transmit the other. For example, as shown in FIG. 4, the frequency spectrum $f_1 \rightarrow f_3$ 432 of the upper layer signal 410 may overlap the frequency spectrum $f_2 \rightarrow f_4$ 434 of the lower layer signal 418 in frequency band $f_2 - f_3$ 436. The upper layer signal 410, however, must be a sufficiently greater amplitude signal than the lower layer signal 418, in order to maintain the signal constellations shown in FIG. 6 and FIG. 7. The modulator 220 may also employ pulse shaping techniques (illustrated by pulse p(t) 430) to account for the limited channel bandwidth. Although FIG. 4 illustrates the same pulse shaping p(t) 430 being applied to both layers, different pulse shaping can be applied to each layer as well.

Integrated Receiver/Decoder

Figure 5:
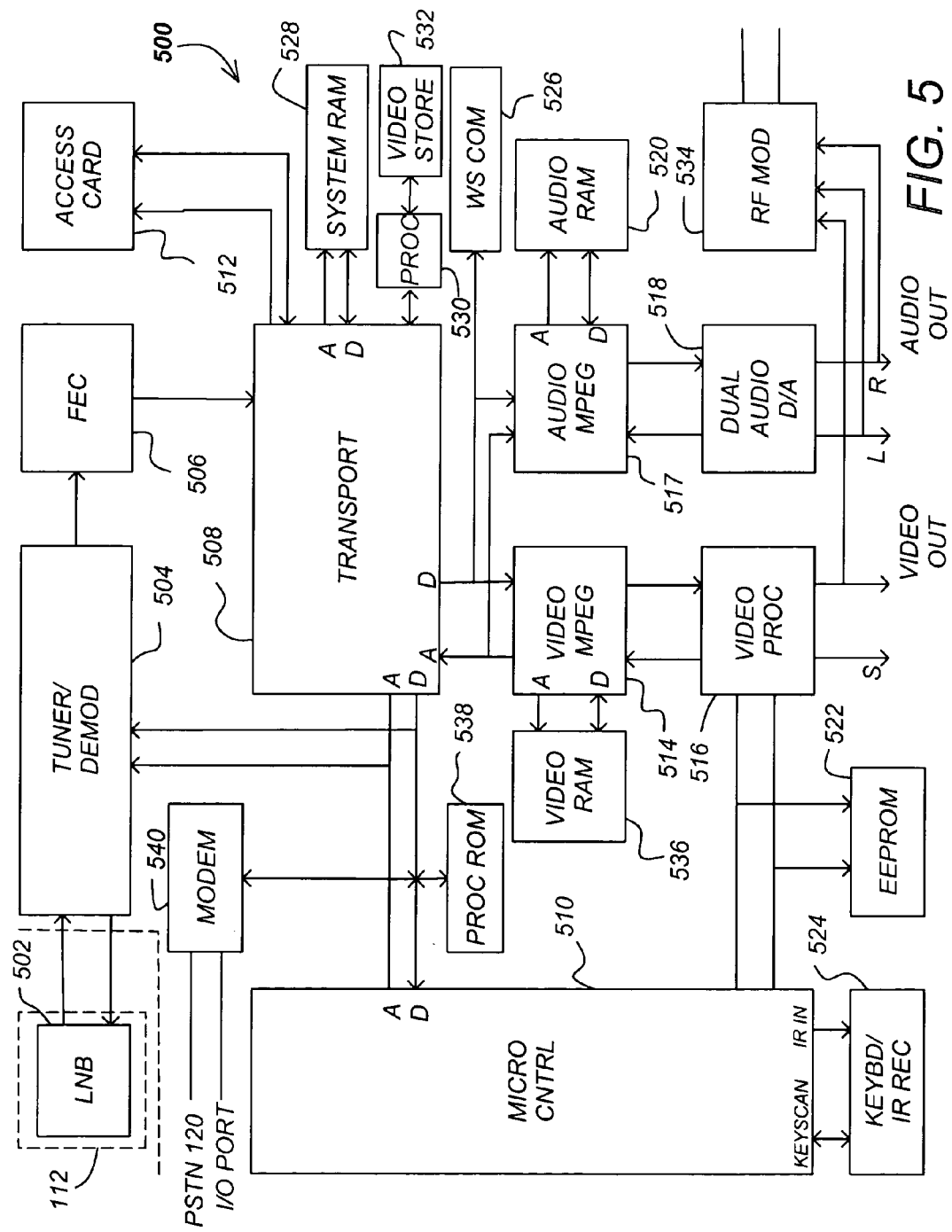
FIG. 5 is a block diagram of an integrated receiver/decoder.

FIG. 5 is a block diagram of an integrated receiver/decoder (IRD) 500 (also hereinafter alternatively referred to as receiver 500). The receiver 500 comprises a tuner/demodulator 504 communicatively coupled to an ODU 112 having one or more LNBs 502. The LNB 502 converts the 12.2- to 12.7 GHz downlink 118 signal from the satellites 108 to, e.g., a 950–1450 MHz signal required by the IRD's 500 tuner/demodulator 504. The LNB 502 may provide either a dual or a single output. The single-output LNB 502 has only one RF connector, while the dual output LNB 502 has two RF output connectors and can be used to feed a second tuner 504, a second receiver 500, or some other form of distribution system.

The tuner/demodulator 504 isolates a single, digitally modulated 24 MHz transponder, and converts the modulated data to a digital data stream. Further details regarding the demodulation of the received signal follow.

The digital data stream is then supplied to a forward error correction (FEC) decoder 506. This allows the IRD 500 to reassemble the data transmitted by the uplink center 104 (which applied the forward error correction to the desired signal before transmission to the subscriber receiving station 110) verifying that the correct data signal was received, and correcting errors, if any. The error-corrected data may be fed from the FEC decoder module 506 to the transport module 508 via an 8-bit parallel interface.

The transport module 508 performs many of the data processing functions performed by the IRD 500. The transport module 508 processes data received from the FEC decoder module 506 and provides the processed data to the video MPEG decoder 514 and the audio MPEG decoder 517. In one embodiment of the present invention, the transport module, video MPEG decoder and audio MPEG decoder are all implemented on integrated circuits. This design promotes both space and power efficiency, and increases the security of the functions performed within the transport module 508. The transport module 508 also provides a passage for communications between the microcontroller 510 and the video and audio MPEG decoders 514, 517. As set forth more fully hereinafter, the transport module also works with the conditional access module (CAM) 512 to determine whether the subscriber receiving station 110 is permitted to access certain program material. Data from the transport module can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a smart card, having contacts cooperatively interacting with contacts in the IRD 500 to pass information. In order to implement the processing performed in the CAM 512, the IRD 500, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 516, which converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if high definition programming is processed.

Audio data is likewise decoded by the MPEG audio decoder 517. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may similarly be supported. For example, other audio formats such as multi-channel DOLBY DIGITAL AC-3 may be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 510 receives and processes command signals from the remote control 524, an IRD 500 keyboard interface, and/or another input device. The microcontroller receives commands for performing its operations from a processor programming memory, which permanently stores such instructions for performing such commands. The processor programming memory may comprise a read only memory (ROM) 538, an electrically erasable programmable read only memory (EEPROM) 522 or, similar memory device. The microcontroller 510 also controls the other digital devices of the IRD 500 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports.

The present invention also comprises a local storage unit such as the video storage device 532 for storing video and/or audio data obtained from the transport module 508. Video storage device 532 can be a hard disk drive, a read/writable compact disc of DVD, a solid state RAM, or any other storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and or retrieve video and other data in the video storage device 532.

The video processing module 516 input can be directly supplied as a video output to a viewing device such as a video or computer monitor. In addition, the video and/or audio outputs can be supplied to an RF modulator 534 to produce an RF output and/or 8 vestigial side band (VSB) suitable as an input signal to a digital terrestrial television tuner. This allows the receiver 500 to operate with televisions without a video output.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the IRD 500 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite transponders and service channel identifications (SCIDs), and also provide TV program listing information to the subscriber 122 identifying program events.

The functionality implemented in the IRD 500 depicted in FIG. 5 can be implemented by one or more hardware modules, one or more software modules defining instructions performed by a processor, or a combination of both.

The present invention provides for the modulation of signals at different power levels and advantageously for the signals to be non-coherent from each layer. In addition, independent modulation and coding of the signals may be performed. Backwards compatibility with legacy receivers, such as a quadrature phase shift keying (QPSK) receiver is enabled and new services are provided to new receivers. A typical new receiver of the present invention uses two demodulators and one remodulator as will be described in detail hereafter.

In a typical backwards-compatible embodiment of the present invention, the legacy QPSK signal is boosted in power to a higher transmission (and reception) level. The legacy receiver will not be able to distinguish the new lower layer signal from additive white Gaussian noise and thus operates in the usual manner. The optimum selection of the layer power levels is based on accommodating the legacy equipment, as well as the desired new throughput and services.

The combined layered signal is demodulated and decoded by first demodulating the upper layer to remove the upper carrier. The stabilized layered signal may then have the upper layer FEC decoded and the output upper layer symbols communicated to the upper layer transport. The upper layer symbols are also employed in a remodulator, to generate an idealized upper layer signal. The idealized upper layer signal is then subtracted from the stable layered signal to reveal the lower layer signal. The lower layer signal is then demodulated and FEC decoded and communicated to the lower layer transport.

The new lower layer signal is provided with a sufficient carrier to thermal noise ratio to function properly. The new lower layer signal and the boosted legacy signal are non-coherent with respect to each other. Therefore, the new lower layer signal can be implemented from a different TWTA and even from a different satellite. The new lower layer signal format is also independent of the legacy format, e.g., it may be QPSK or 8PSK, using the conventional concatenated FEC code or using a new Turbo code. The lower layer signal may even be an analog signal.

Signals, systems and methods using the present invention may be used to supplement a pre-existing transmission compatible with legacy receiving hardware in a backwards-compatible application or as part of a preplanned layered modulation architecture providing one or more additional layers at a present or at a later date.

Layered Signals

Figure 6B:
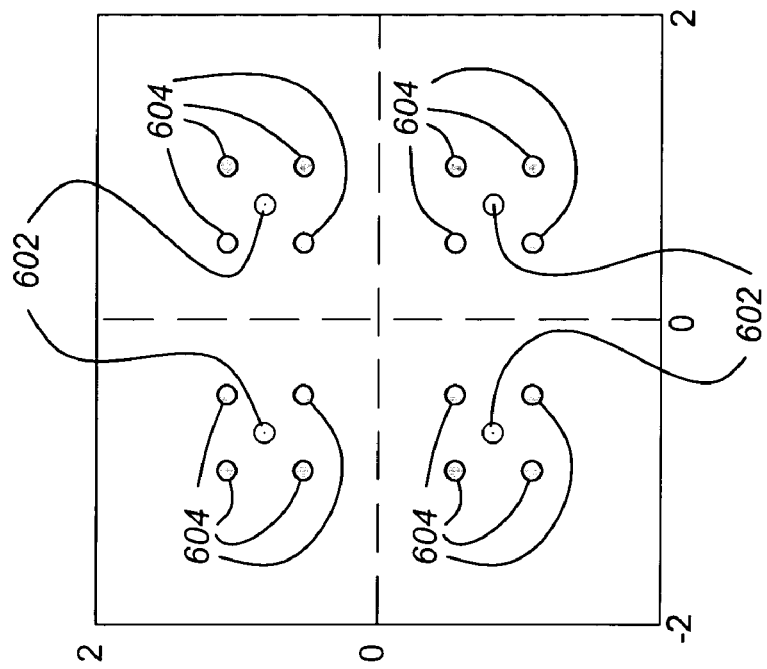
FIGS. 6A–6C are diagrams illustrating the basic relationship of signal layers in a layered modulation transmission.
Figure 6A:
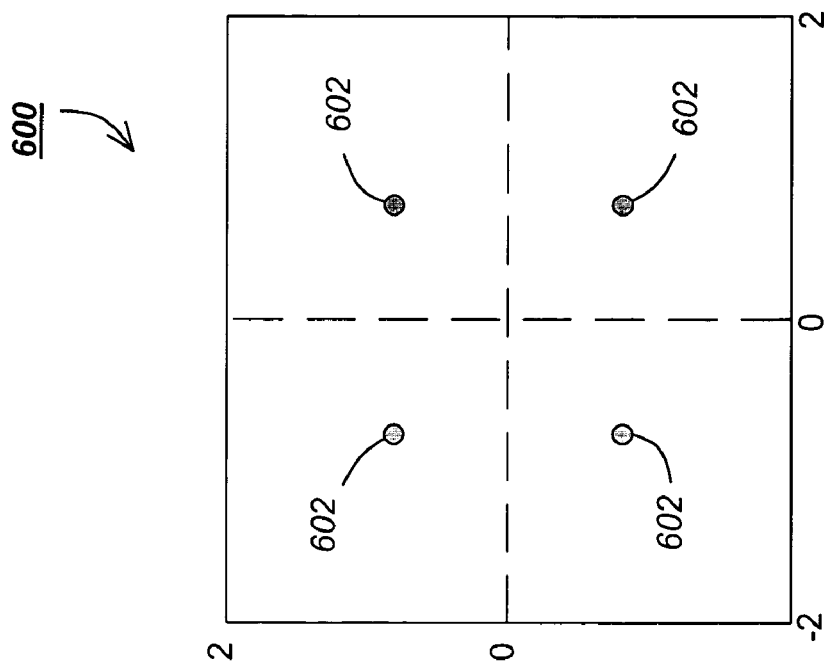
Figure 6C:
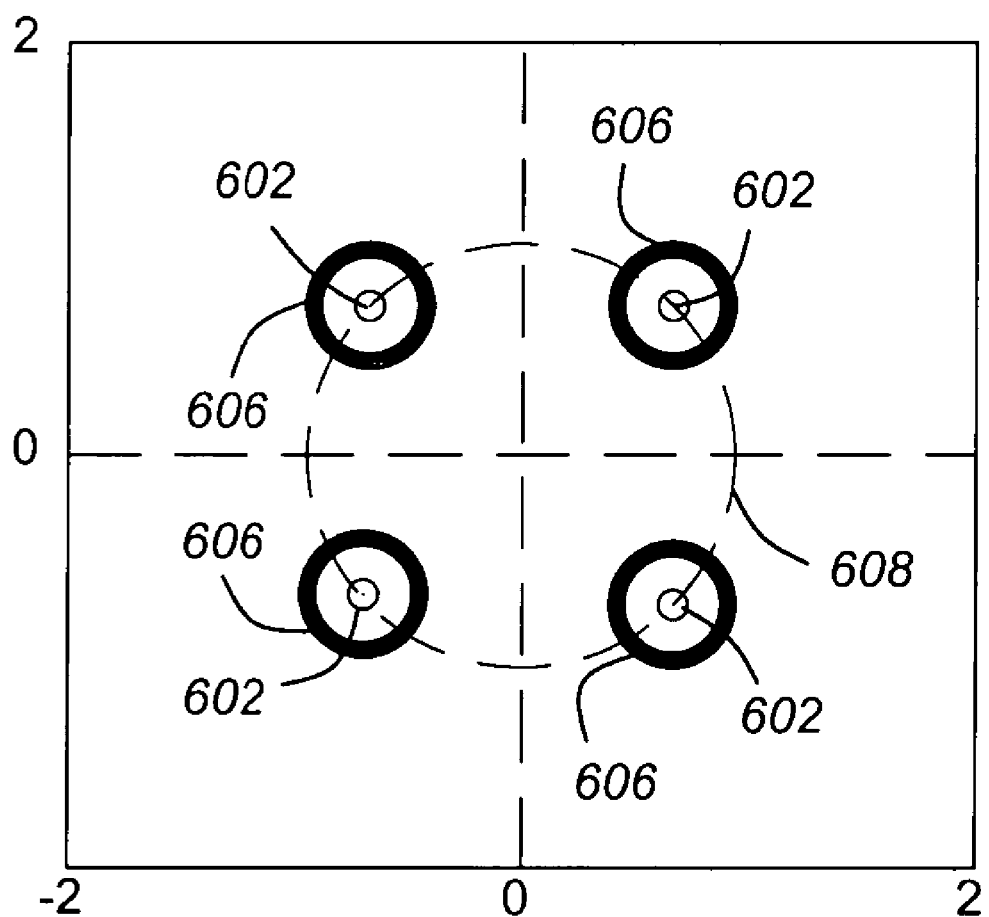

FIGS. 6A–6C illustrate the basic relationship of signal layers in a layered modulation transmission. In these figures the horizontal axis is for the in-phase, or "I" value of the displayed symbol, and the vertical axis for the quadrature, or "Q" value of the displayed symbol. FIG. 6A illustrates a first layer signal constellation 600 of a transmission signal showing the signal points or symbols 602. This signal constellation is FIG. 6B illustrates the second layer signal constellation of symbols 604 over the first layer signal constellation 600 where the layers are coherent. FIG. 2C illustrates a second signal layer 606 of a second transmission layer over the first layer constellation where the layers may be non-coherent. The second layer 606 rotates about the first layer constellation 602 due to the relative modulating frequencies of the two layers in a non-coherent transmission. Both the first and second layers rotate about the origin due to the first layer modulation frequency as described by path 608.

Figure 7B:
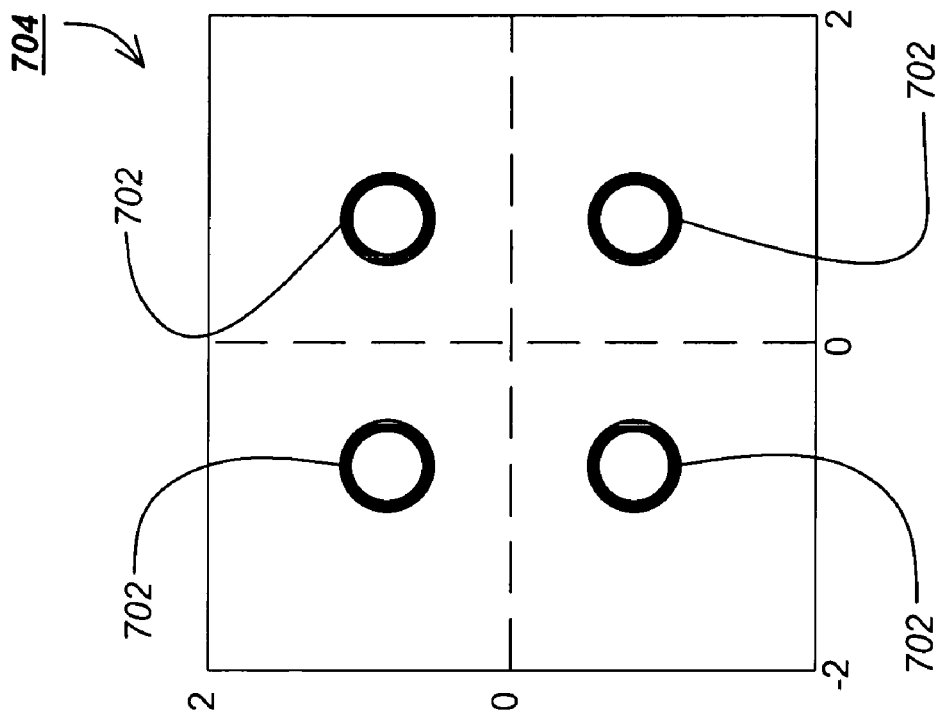
FIGS. 7A–7C are diagrams illustrating a signal constellation of a second transmission layer over the first transmission layer after first layer demodulation.
Figure 7A:
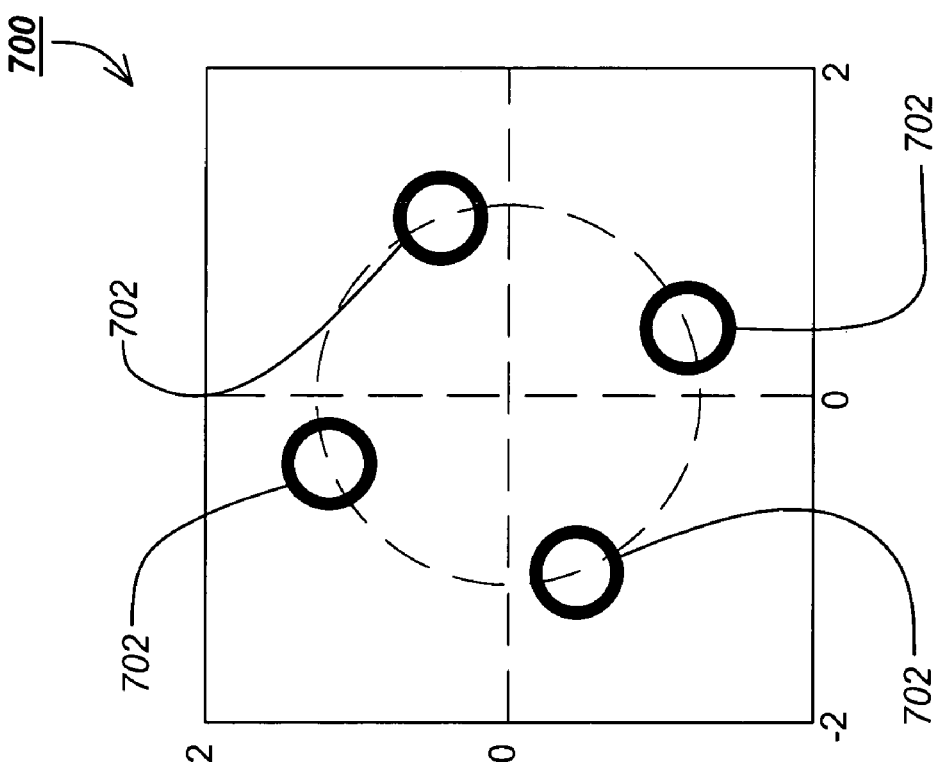
Figure 7C:
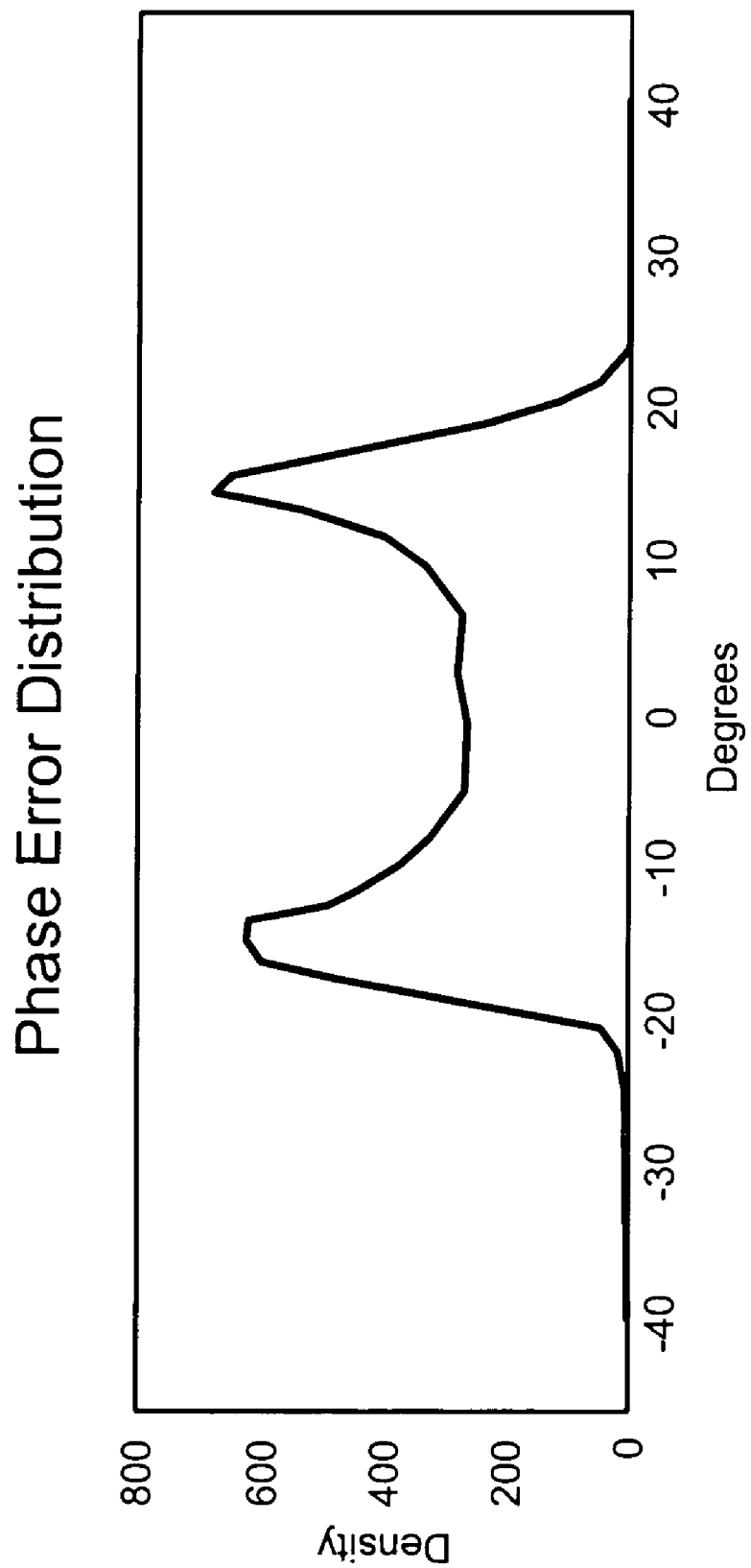

FIGS. 7A–7C are diagrams illustrating a signal constellation of a second transmission layer over the first transmission layer after first layer demodulation. FIG. 7A shows the constellation 700 before the first carrier recovery loop (CRL) and FIG. 7B shows the constellation 704 after CRL. In this case, the signal points of the second layer are actually rings 702. FIG. 7C depicts a phase distribution of the received signal with respect to nodes 602.

Relative modulating frequencies cause the second layer constellation to rotate around the nodes of the first layer constellation. After the second layer CRL this rotation is eliminated. The radius of the second layer constellation is determined by its power level. The thickness of the rings 702 is determined by the carrier to noise ratio (CNR) of the second layer. As the two layers are non-coherent, the second layer may also be used to transmit analog or digital signals.

Figure 8:
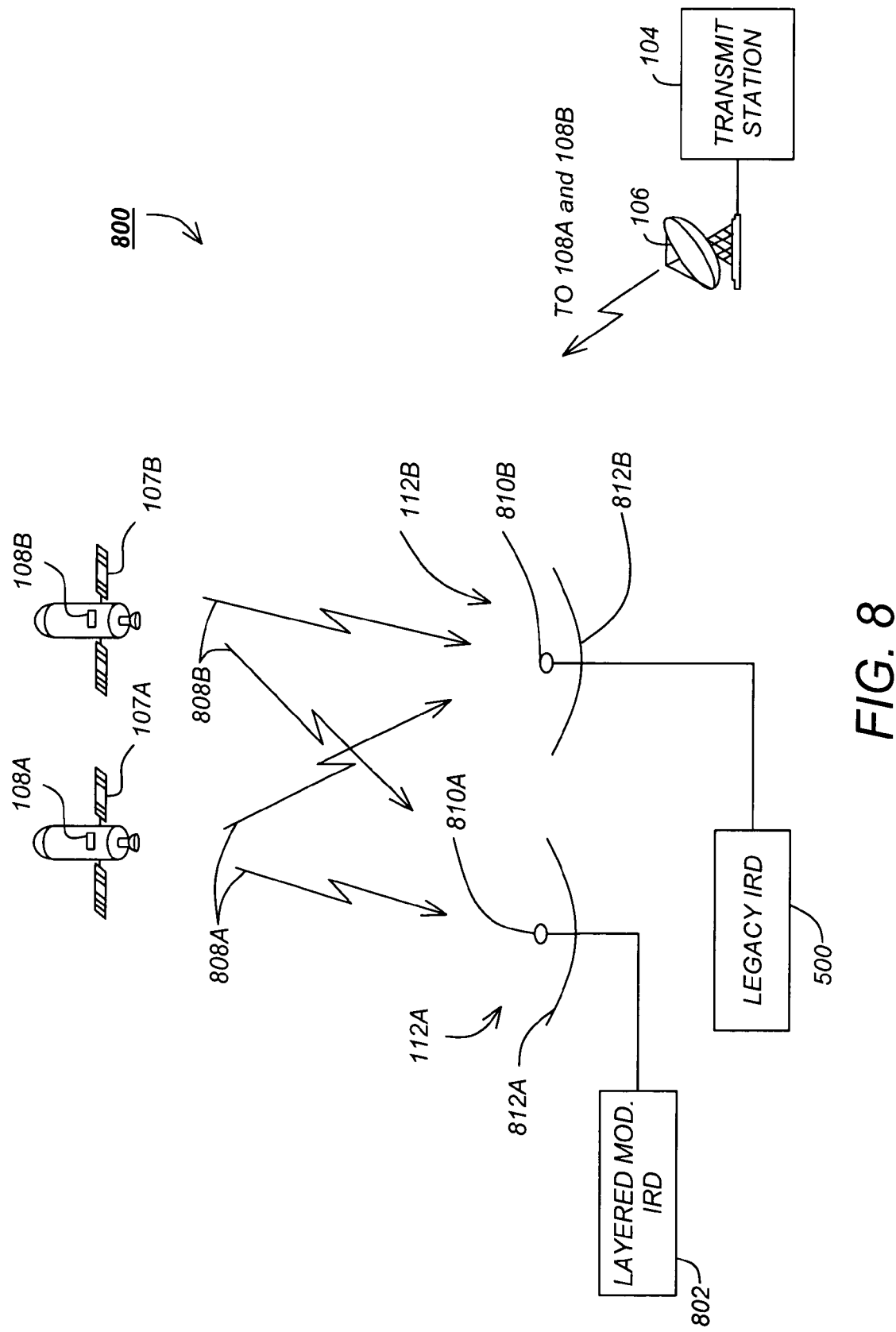
FIG. 8 is a diagram showing a system for transmitting and receiving layered modulation signals.

FIG. 8 is a diagram showing a system for transmitting and receiving layered modulation signals. Separate transmitters 107A, 107B, as may be located on any suitable platform, such as satellites 108A, 108B, are used to non-coherently transmit different layers of a signal of the present invention. Uplink signals are typically transmitted to each satellite 108A, 108B from one or more transmitters 105 via an antenna 106. The layered signals 808A, 808B (downlink signals) are received at receiver antennas 112A, 112B, such as satellite dishes, each with a low noise block (LNB) 810A, 810B where they are then coupled to integrated receiver/decoders (IRDs) 500, 802. Because the signal layers may be transmitted non-coherently, separate transmission layers may be added at any time using different satellites 108A, 108B or other suitable platforms, such as ground based or high altitude platforms. Thus, any composite signal, including new additional signal layers will be backwards compatible with legacy receivers 500, which will disregard the new signal layers. To ensure that the signals do not interfere, the combined signal and noise level for the lower layer must be at or below the allowed noise floor for the upper layer.

Layered modulation applications include backwards compatible and non-backwards compatible applications. "Backwards compatible" in this sense, describes systems in which legacy receivers 500 are not rendered obsolete by the additional signal layer(s). Instead, even if the legacy receivers 500 are incapable of decoding the additional signal layer(s), they are capable of receiving the layered modulated signal and decoding the original signal layer. In these applications, the pre-existing system architecture is accommodated by the architecture of the additional signal layers. "Non-backwards compatible" describes a system architecture which makes use of layered modulation, but the modulation and coding scheme employed is such that pre-existing equipment is incapable of receiving and decoding the information on additional signal layer(s).

The pre-existing legacy IRDs 500 decode and make use of data only from the layer (or layers) they were designed to receive, unaffected by the additional layers. The present invention may be applied to existing direct satellite services which are broadcast to individual users in order to enable additional features and services with new receivers without adversely affecting legacy receivers and without requiring additional signal frequencies.

Demodulator and Decoder

Figure 9:
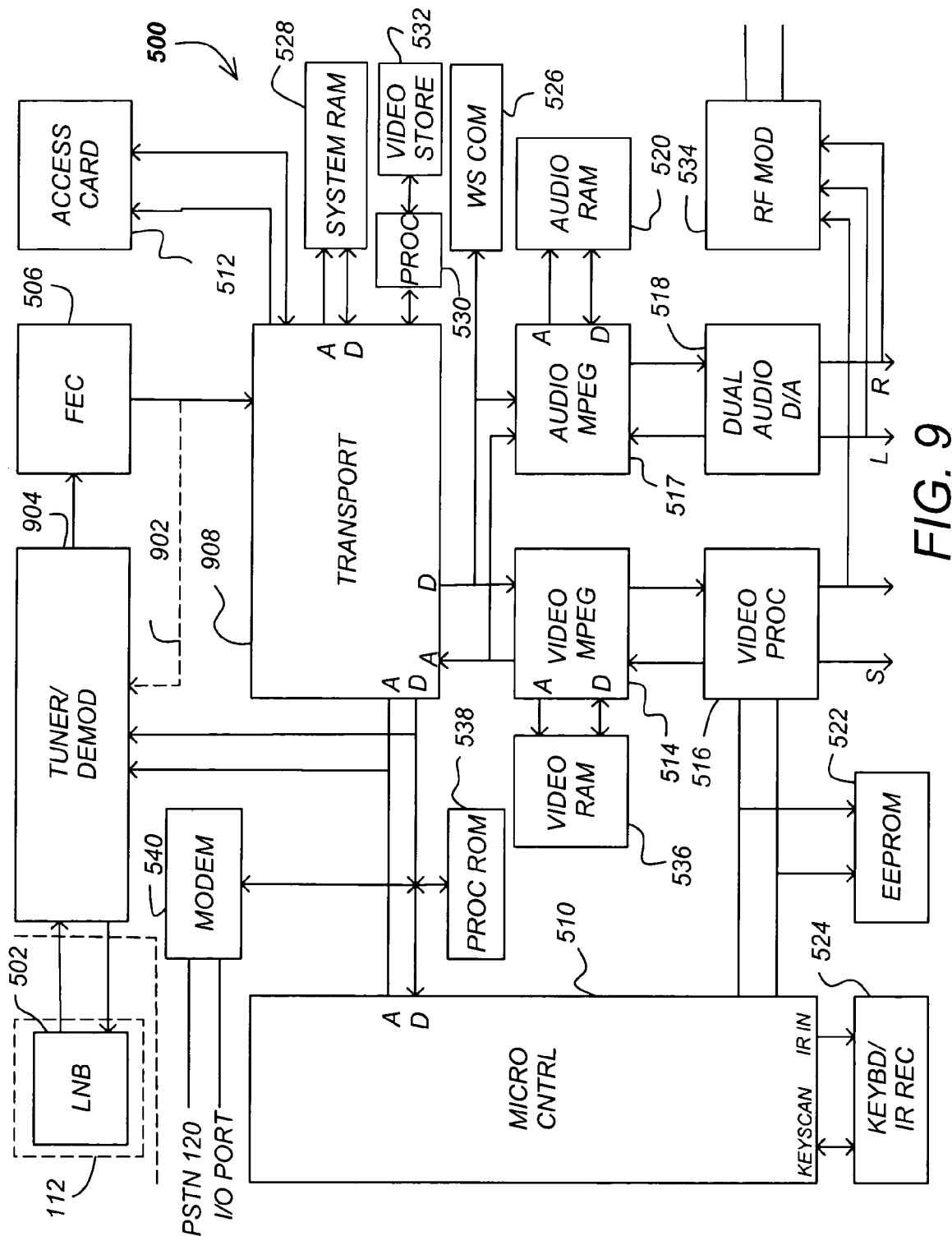
FIG. 9 is a block diagram depicting one embodiment of an enhanced receiver/decoder capable of receiving layered modulation signals.

FIG. 9 is a block diagram depicting one embodiment of an enhanced IRD 802 capable of receiving layered modulation signals. The enhanced IRD 802 includes a feedback path 902 in which the FEC decoded symbols are fed back to a enhanced modified tuner/demodulator 904 and transport module 908.

Figure 10A:
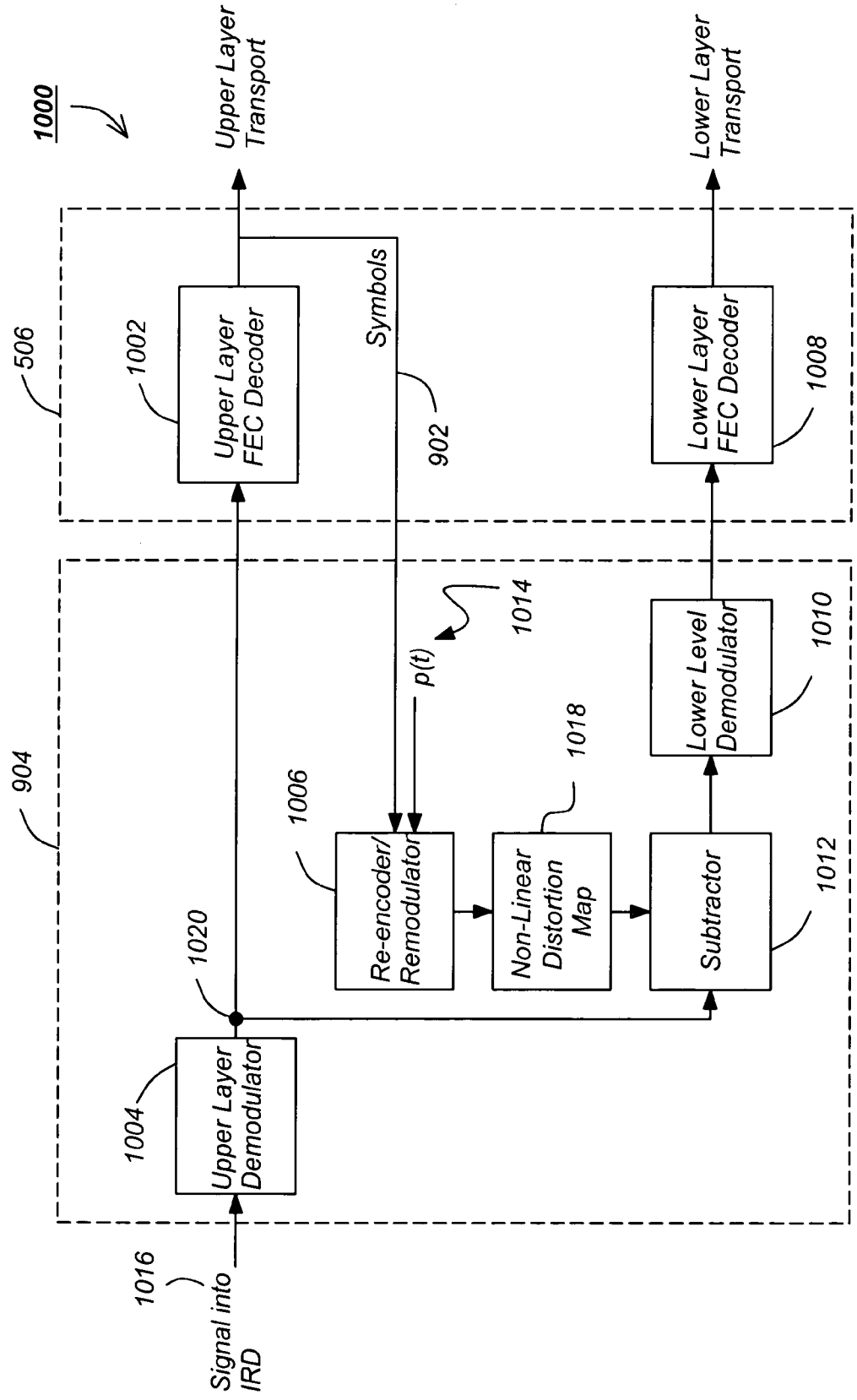
FIG. 10A is a block diagram of one embodiment of the enhanced tuner/modulator and FEC encoder.

FIG. 10A is a block diagram of one embodiment of the enhanced tuner/modulator 904 and FEC encoder 506. FIG. 10A depicts reception where layer subtraction is performed on a signal where the upper carrier has been demodulated. The upper layer of the received combined signal 1016 from the LNB 502, which may contain legacy modulation format, is provided to and processed by an upper layer demodulator 1004 to produce the stable demodulated signal 1020. The demodulated signal 1020 is fed to a communicatively coupled FEC decoder 1002 which decodes the upper layer to produce the upper layer symbols which are output to an upper layer transport. The upper layer symbols are also used to generate an idealized upper layer signal. The upper layer symbols may be produced from the decoder 1002 after Viterbi decode (BER<$10^{-3}$ or so) or after Reed-Solomon (RS) decode (BER<$10^{-9}$ or so), in typical decoding operations known to those skilled in the art. The upper layer symbols are provided via feedback path 902 from the upper layer decoder 1002 to a remodulator 1006 and then a module which applies the distortion that would be introduced by the satellite downlink network. This effectively produces an idealized upper layer signal. The idealized upper level signal is subtracted from the demodulated upper layer signal 1020.

In order for the subtraction to leave a clean lower layer signal, the upper layer signal must be precisely reproduced. The modulated signal may have been distorted, for example, by traveling wave tube amplifier (TWTA) non-linearity or other non-linear or linear distortions in the transmission channel. The distortion effects are estimated from the received signal after the fact or from TWTA characteristics which may be downloaded into the IRD in AM-AM and/or AM-PM maps 1014.

A subtractor 1012 then subtracts the idealized upper layer signal from the stable demodulated signal 1020. This leaves the lower-power second layer signal. The subtractor 1012 may include a buffer or delay function to retain the stable demodulated signal 1020 while the idealized upper layer signal is being constructed. The second layer signal is demodulated by the lower level demodulator 1010 and FEC decoded by decoder 1008 according to its signal format to produce the lower layer symbols, which are provided to a transport module similar to 508 but for the lower layer.

Figure 10B:
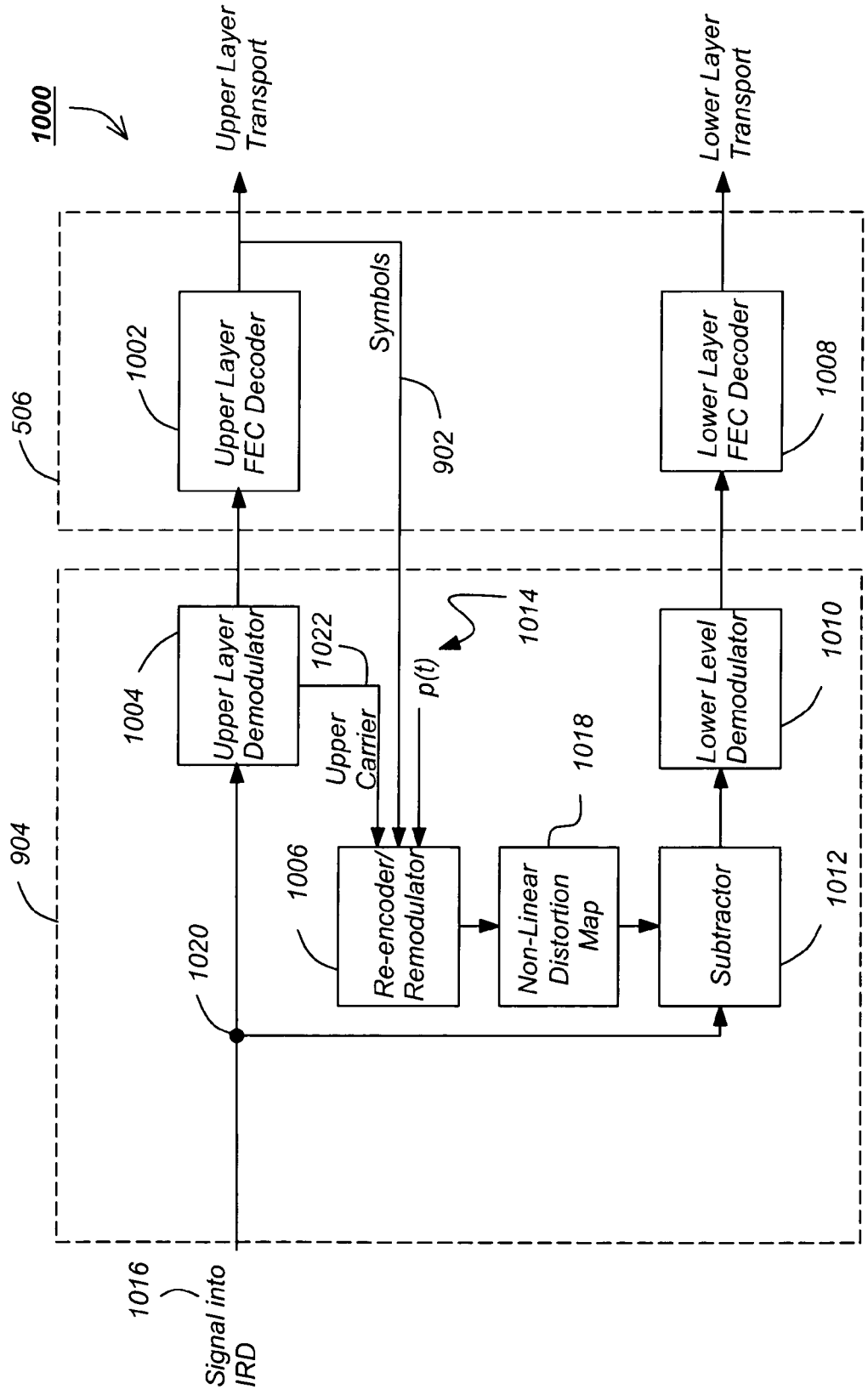
FIG. 10B depicts another embodiment of the enhanced tuner/modulator wherein layer subtraction is performed on the received layered signal.

FIG. 10B depicts another embodiment wherein layer subtraction is performed on the received layered signal. In this case, the upper layer demodulator 1004 produces the upper carrier signal 1022. An upper carrier signal 1022 is provided to the remodulator 1006. The remodulator 1006 provides the remodulated signal to the non-linear distortion mapper 1018 which effectively produces an idealized upper layer signal. Unlike the embodiment shown in FIG. 10A, in this embodiment, the idealized upper layer signal includes the upper layer carrier for subtraction from the received combined signal 416.

Other equivalent methods of layer subtraction will occur to those skilled in the art and the present invention should not be limited to the examples provided here. Furthermore, those skilled in the art will understand that the present invention is not limited to two layers; additional layers may be included. Idealized upper layers are produced through remodulation from their respective layer symbols and subtracted. Subtraction may be performed on either the received combined signal or a demodulated signal. Finally, it is not necessary for all signal layers to be digital transmissions; the lowest layer may be an analog transmission.

The following analysis describes the exemplary two layer demodulation and decoding. It will be apparent to those skilled in the art that additional layers may be demodulated and decoded in a similar manner. The incoming combined signal is represented as:

$$s_{UL}(t) = f_U\left(M_U \exp(j\omega_U t + \theta_U) \sum_{m=-\infty}^{\infty} S_{Um} p(t - mT)\right) + f_L\left(M_L \exp(j\omega_L t + \theta_L) \sum_{m=-\infty}^{\infty} S_{Lm} p(t - mT + \Delta T_m)\right) + n(t)$$

where, $M_U$ is the magnitude of the upper layer QPSK signal and $M_L$ is the magnitude of the lower layer QPSK signal and $M_L \ll M_U$. The signal frequencies and phase for the upper and lower layer signals are respectively $\omega_U$, $\theta_U$ and $\omega_L$, $\theta_L$, respectively. The symbol timing misalignment between the upper and lower layers is $\Delta T_m$. The expression p(t−mT) represents the time shifted version of the pulse shaping filter p(t) 430 employed in signal modulation. QPSK symbols $S_{Um}$ and $S_{Lm}$ are elements of $$\left\{\exp\left(j\frac{n\pi}{2}\right), n = 0, 1, 2, 3\right\}.$$

$f_U(\bullet)$ and $f_L(\bullet)$ denote the distortion function of the TWTAs for the respective signals.

Ignoring $f_U(\bullet)$ and $f_L(\bullet)$ and noise n(t), the following represents the output of the demodulator 1004 to the FEC decoder 1002 after removing the upper carrier:

$$s'_{UL}(t) = M_U \sum_{m=-\infty}^{\infty} S_{Um} p(t - mT) + M_L \exp\{j(\omega_L - \omega_U)t + \theta_L - \theta_U\} \sum_{m=-\infty}^{\infty} S_{Lm} p(t - mT + \Delta T_m)$$

Because of the magnitude difference between $M_U$ and $M_L$, the upper layer decoder 402 disregards the $M_L$ component of the $s'_{UL}(t)$.

After subtracting the upper layer from $s_{UL}(t)$ in the subtractor 1012, the following remains:

$$s_L(t) = M_L \exp\{j(\omega_L - \omega_U)t + \theta_L - \theta_U\} \sum_{m=-\infty}^{\infty} S_{Lm} p(t - mT + \Delta T_m).$$

Any distortion effects, such as TWTA nonlinearity effects are estimated for signal subtraction. In a typical embodiment of the present invention, the upper and lower layer frequencies are substantially equal. Significant improvements in system efficiency can be obtained by using a frequency offset between layers.

Using the present invention, two-layered backward compatible modulation with QPSK doubles the current legacy system capacity that uses a legacy operating mode with a 6/7 FEC code rate. This capacity increase is enabled by transmitting a backward compatible upper layer carrier through a TWTA that is approximately 6.2 dB above the power used in the legacy system. The new lower layer QPSK signals may be transmitted from a separate transmitter, or from a different satellite for example.

Systems using 16QAM modulation could be designed to provide similar transmission capacity, but this modulation format requires reasonably linear transmitting amplifiers. With layered modulation, separate amplifiers can be used for each layer, and if QPSK signals are used for these layers then these amplifiers can be used in a more efficient non-linear mode. Thus layered modulation eliminates the need for less efficient linear travelling wave tube amplifiers (TWTAs) as are needed for 16QAM. Also, no phase error penalty is imposed on higher order modulations such as 8PSK and 16QAM.

Backward Compatible Applications

Figure 11A:
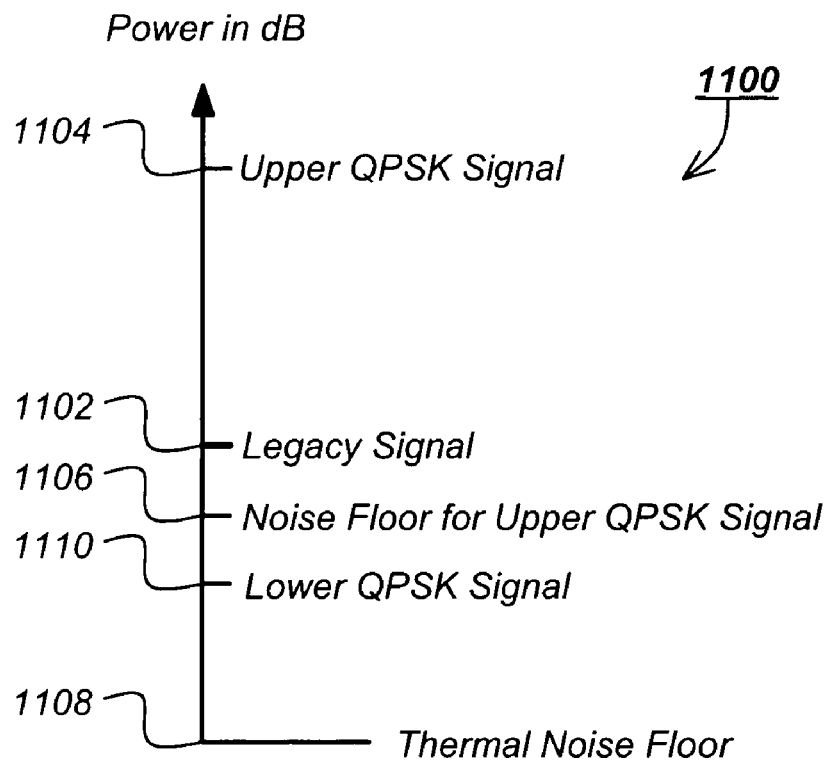
FIGS. 11A and 11B depicts the relative power levels of example embodiments of the present invention.

FIG. 11A depicts the relative power levels 1100 of example embodiments of the present invention without taking into account the effects of rain. Accommodation of rain fade effects comes through the inclusion of clear sky margin in the calculation of transmit power levels, and this is treated in a later section. FIG. 11A is not a scale drawing. This embodiment doubles the pre-existing rate 6/7 capacity by using a TWTA whose power level is 6.2 dB above a pre-existing (legacy) TWTA, and a second TWTA whose power level is 2 dB below that of a pre-existing (legacy) TWTA. This embodiment uses upper and lower QPSK layers which are non-coherent. An FEC code rate of 6/7 is also used for both layers. In this embodiment, the signal of the legacy QPSK signal 1102 is used to generate the upper layer 1104 and a new QPSK layer is the lower layer 1110. The legacy QPSK signal 1102 has a threshold CNR (i.e., the carrier to noise ratio required to achieve acceptable performance) of approximately 7 dB. The new lower QPSK layer 1110 has a threshold CNR of approximately 5 dB. In the present invention, then, the lower QPSK layer transmit power level 1110 is first set so that the received lower layer power is 5 dB above the reference thermal noise power level 1108. Both the thermal noise and the lower layer signal will appear as noise to the upper layer legacy QPSK signal, and this combined noise power must be taken into account when setting the upper layer transmit power level. The combined power of these two noise sources 1106 is 6.2 dB above the reference thermal noise floor 1108. The legacy QPSK signal must then be boosted in power by approximately 6.2 dB above the legacy signal power level 1102 bringing the new power level to approximately 13.2 dB as the upper layer 1104. In this way the combined lower layer signal power and thermal noise power is kept at or below the tolerable noise floor 1106 of the upper layer. It should be noted that the invention may be extended to multiple layers with mixed modulations, coding and code rates.

In an alternate embodiment of this backwards compatible application, an FEC code rate of 2/3 may be used for both the upper and lower layers 1104, 1110. In this case, the threshold CNR of the legacy QPSK signal 1102 (with an FEC code rate of 2/3) is approximately 5.8 dB. The legacy signal 1102 is boosted by approximately 5.3 dB to approximately 11.1 dB (4.1 dB above the legacy QPSK signal 1102 with an FEC code rate of 2/3) to form the upper QPSK layer 1104. The new lower QPSK layer 1110 has a threshold CNR of approximately 3.8 dB. The total signal and noise of the lower layer 1110 is kept at or below approximately 5.3 dB, the tolerable noise floor 1106 of the upper QPSK layer. In this case, the total capacity is 1.55 times that the legacy signal 1102.

In a further embodiment of a backwards compatible application of the present invention the code rates between the upper and lower layers 1104, 1110 may be mixed. For example, the legacy QPSK signal 502 may be boosted by approximately 5.3 dB to approximately 12.3 dB with the FEC code rate unchanged at 6/7 to create the upper QPSK layer 1104. The new lower QPSK layer 1110 may use an FEC code rate of 2/3 with a threshold CNR of approximately 3.8 dB. In this case, the total capacity is 1.78 times that of the legacy signal 1102.

Non-Backward Compatible Applications

As previously discussed the present invention may also be used in "non-backward compatible" applications. In a first example embodiment, two QPSK layers 1104, 1110 are used each at an FEC code rate of 2/3. The upper QPSK layer 504 has a threshold CNR of approximately 4.1 dB above its noise floor 1106 and the lower QPSK layer 1110 also has a threshold CNR of approximately 4.1 dB. The combined power of the thermal noise and the lower QPSK layer 1110 is approximately 5.5 dB above the reference thermal noise level 1108. The CNR for the upper QPSK signal 1104 is then set at approximately 9.6 dB (4.1+5.5 dB), merely 2.4 dB above the legacy QPSK signal rate 6/7. The capacity is then a factor of approximately 1.56 compared to the legacy rate 6/7.

Figure 11B:
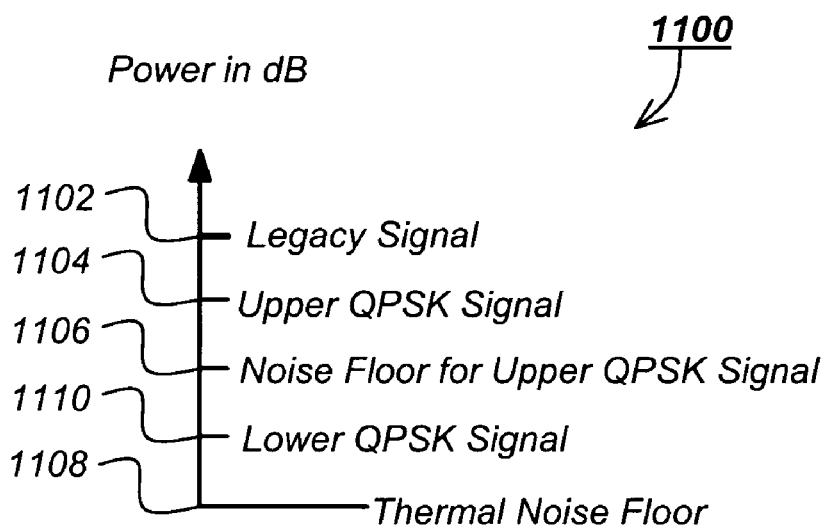

FIG. 11B depicts the relative power levels of an alternate embodiment wherein both the upper and lower layers 1104, 1110 can be below the legacy signal level 1102. The two QPSK layers 1104, 1110 use a code rate of ½. The lower and upper QPSK layers have a threshold CNR of approximately 2.0 dB. In this case, the upper QPSK layer 1104 is approximately 2.0 dB above its noise floor 1106 of approximately 4.1 dB. The upper layer signal level of 6.1 dB is lower than the 7.0 dB for the legacy signal. The capacity of this embodiment is a factor of approximately 1.17 compared to the legacy rate 6/7.

System Optimization

Figure 12:
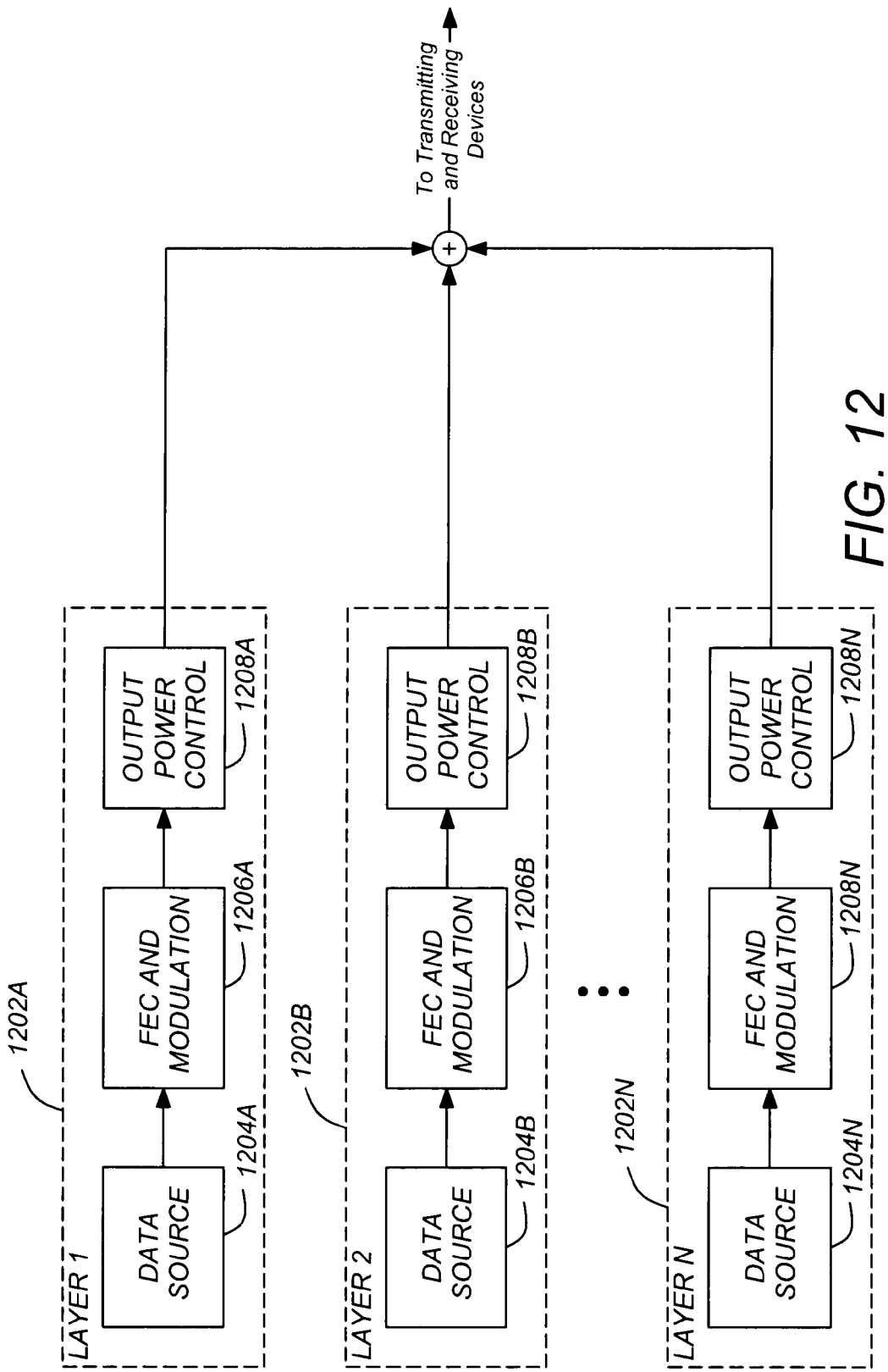
FIG. 12 is a diagram presenting a generalized multi-layer modulation system.

FIG. 12 is a diagram presenting presents a generalized multi-layer modulation system. Each of the multiple layers 1202A–1202N includes a data source (1204A–1204N, a coder and modulator 1206A–1206N, and an output power controller 1208–1208N. While all of the layers 1202A–1202N share the same transmission frequency spectrum, the system parameters (including output power, error rate, etc.) of each layer can be adjusted largely independent of the system parameters for the other layers. The transmission and the receiving devices process the combined signal at the same time.

The following discussion describes the optimization of a two layer modulation system. The two layer modulation system includes a first (or upper) layer and a second (or lower layer) typically transmitted with a carrier having lower power than that of the upper layer. The power difference between the upper and lower layers is referred to as the separation power S. In another words, the transmission power of the upper layer has "separation power" S more than the transmission power of the lower layer. We also define the system power of the two-layer system as the overall power of the combined system power including the upper layer and the lower layer. The system CNR ($CNR_S$) is defined to be the carrier (the system power with both upper and lower layer) to the noise ratio.

For a given modulation system having a system $CNR_S$, the bit error rate (BER) of the upper layer ($BER_U$) improves with the increase of the power separation S. However, the relationship between the BER for the lower layer BERL and the power separation does not exhibit the same characteristics. Counterintuitively, excessive or inadequate separation power S will result in a poorly performing lower layer, because the demodulation and decoding of the lower layer depends on the correct demodulation and decoding of the upper layer.

Figure 13:
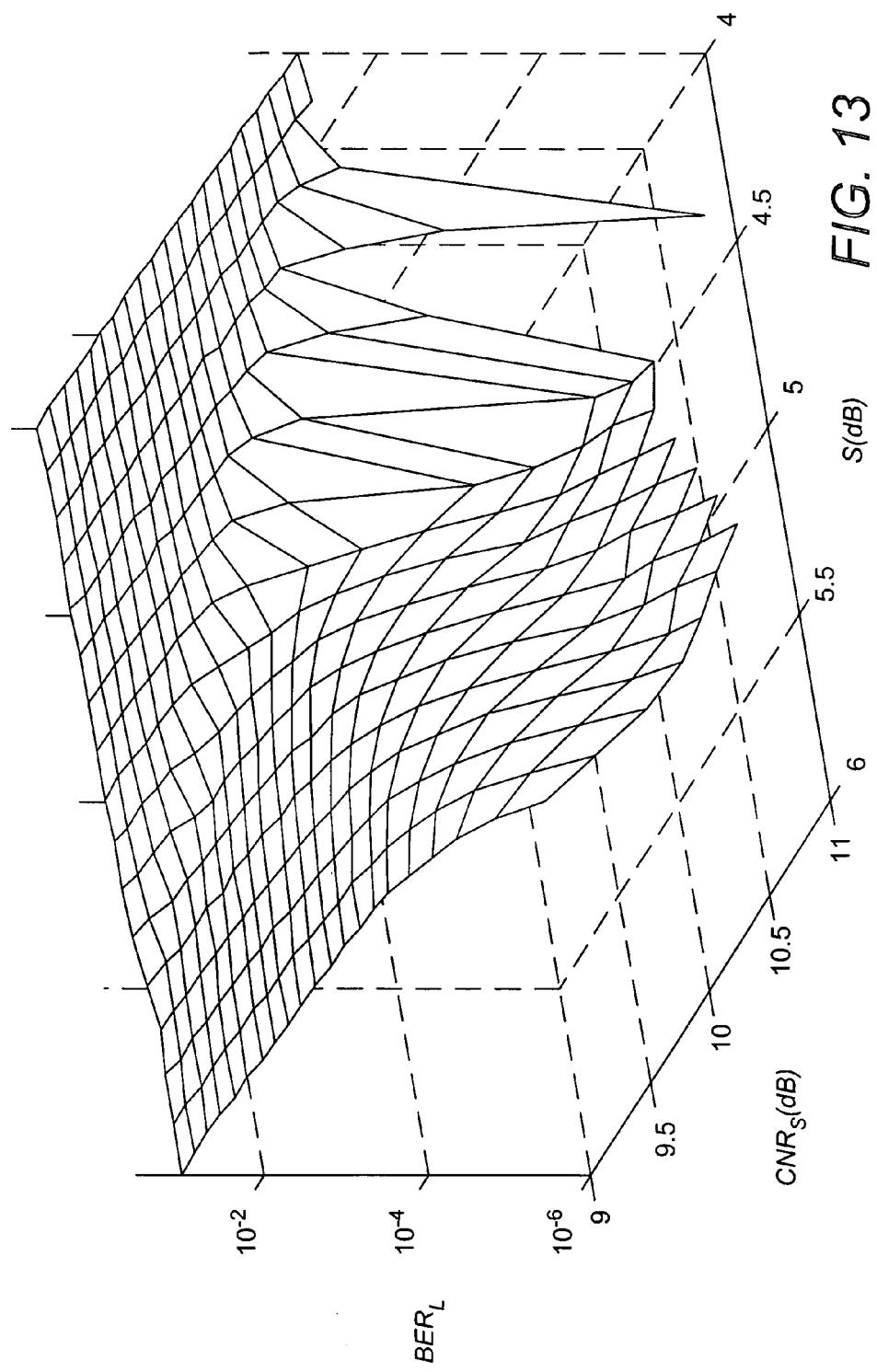
FIG. 13 is a three-dimensional plot showing an exemplary relationship between separation power S, system CNR, $CNR_S$, and the bit error rate of the lower layer $BER_L$ of a candidate system.

FIG. 13 is three-dimensional plot showing an exemplary relationship between the separation power S, system CNR, $CNR_S$, and the bit error rate of the lower layer $BER_L$. Note that given a particular $CNR_S$ value, the system exhibits improved performance (in terms of lower level bit error rate $BER_L$) when the upper and lower layer separation power S is at an optimal value or within a particular range of values.

Figure 14:
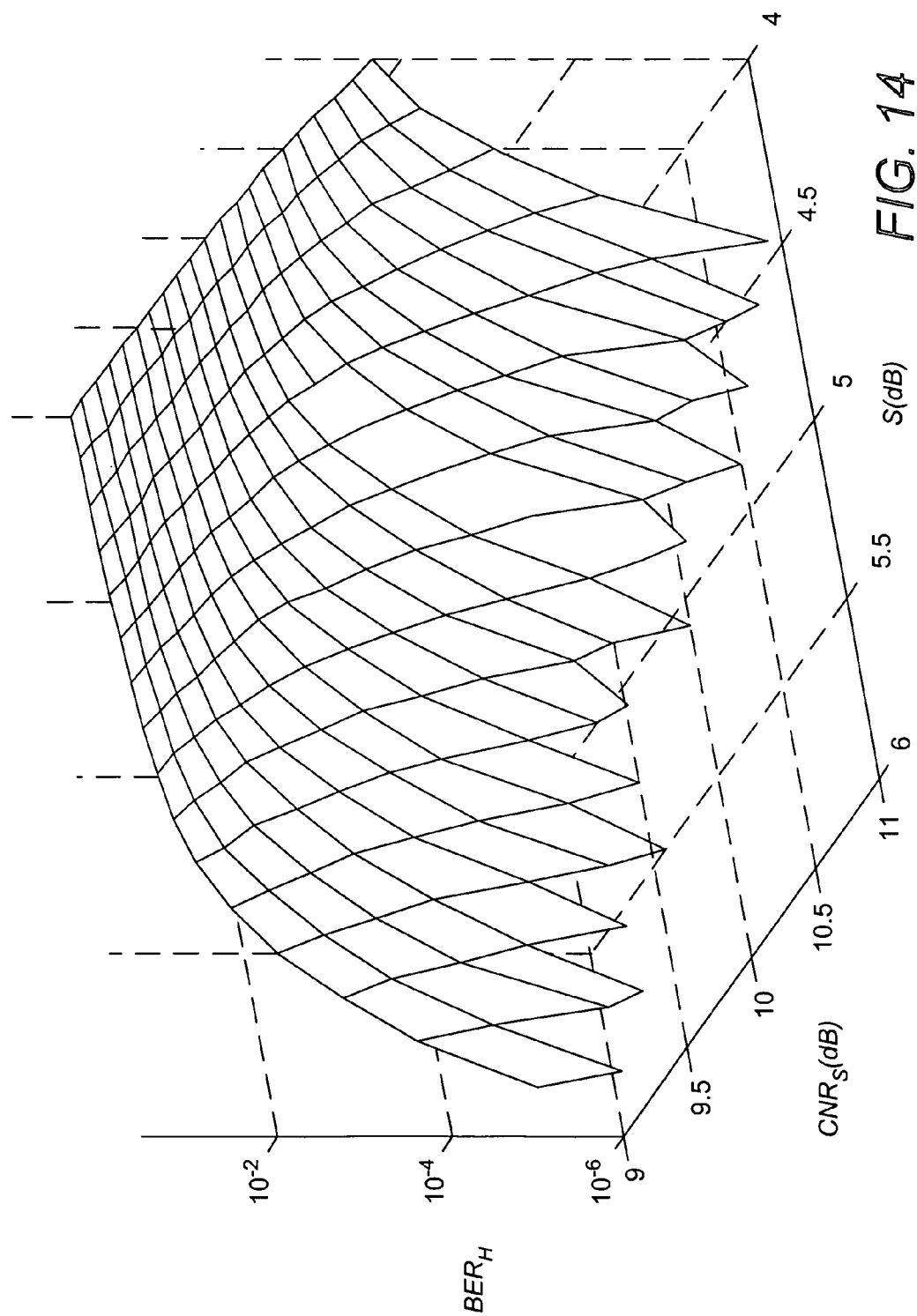
FIG. 14 is a plot of $BER_U$ as a function of $CNR_S$ and S.

FIG. 14 is a plot of $BER_U$ as a function of $CNR_s$ and S. In contrast with FIG. 13, which shows an optimal design range or point, note that given a particular system CNR, $CNR_S$, the upper layer bit error rate $BER_U$ decreases monotonically with an increased separation power S. Also, given a particular separation power S, $BER_U$ is improved with increasing $CNR_S$.

The foregoing information provides insight regarding the task of building a system having an optimum upper layer and lower layer CNR, $CNR_U$ and $CNR_L$. An optimization technique will be defined under the assumption that the upper and lower layers utilize the same modulation technique (but perhaps different coding techniques). Then, that technique will be expanded to consider cases when the upper and lower layer modulation techniques are different as well.

For a given system $CNR_S$ and separation power S, the relationships described in Equations (1) and (2) apply.

$$CNR_U = 10\log_{10} \frac{10^{\frac{(CNR_S+S)}{10}}}{1 + 10^{\frac{S}{10}} + 10^{\frac{CNR_S}{10}}} \quad \text{Equation (1)}$$

$$CNR_L = 10\log_{10} \frac{10^{\frac{CNR_S}{10}}}{1 + 10^{\frac{S}{10}}} \quad \text{Equation (2)}$$

wherein all variables are described in terms of decibels (dB).

Figure 15A:
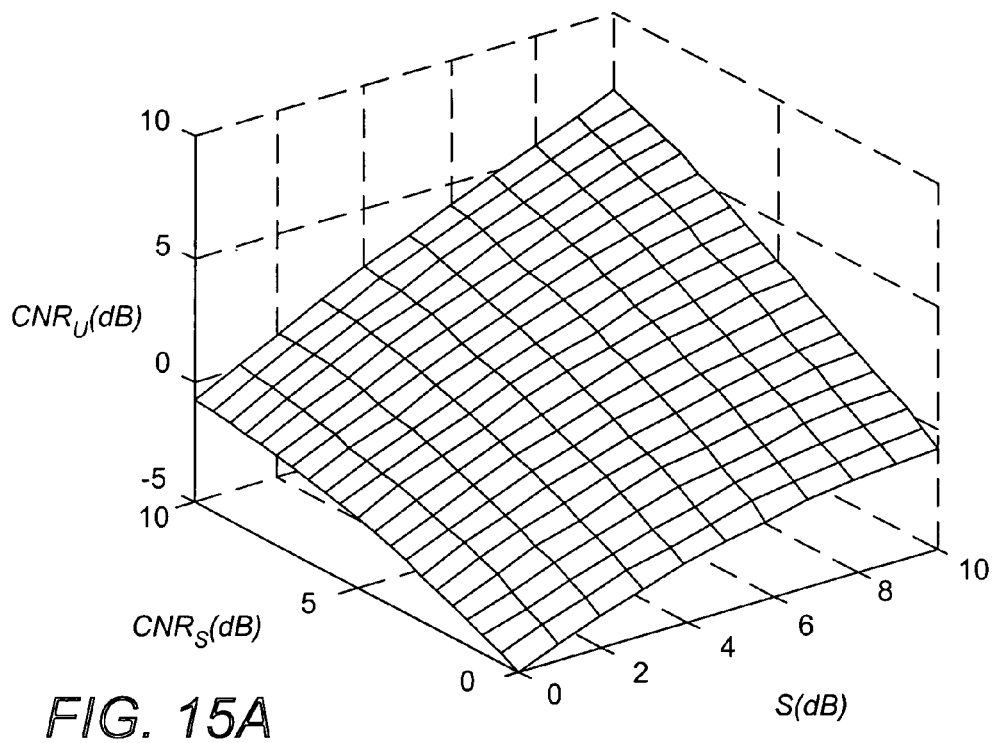
FIGS. 15A and 15B are plots visually depicting how the upper and lower layer CNR varies with the system CNR ($CNR_S$) and the power separation S.
Figure 15B:
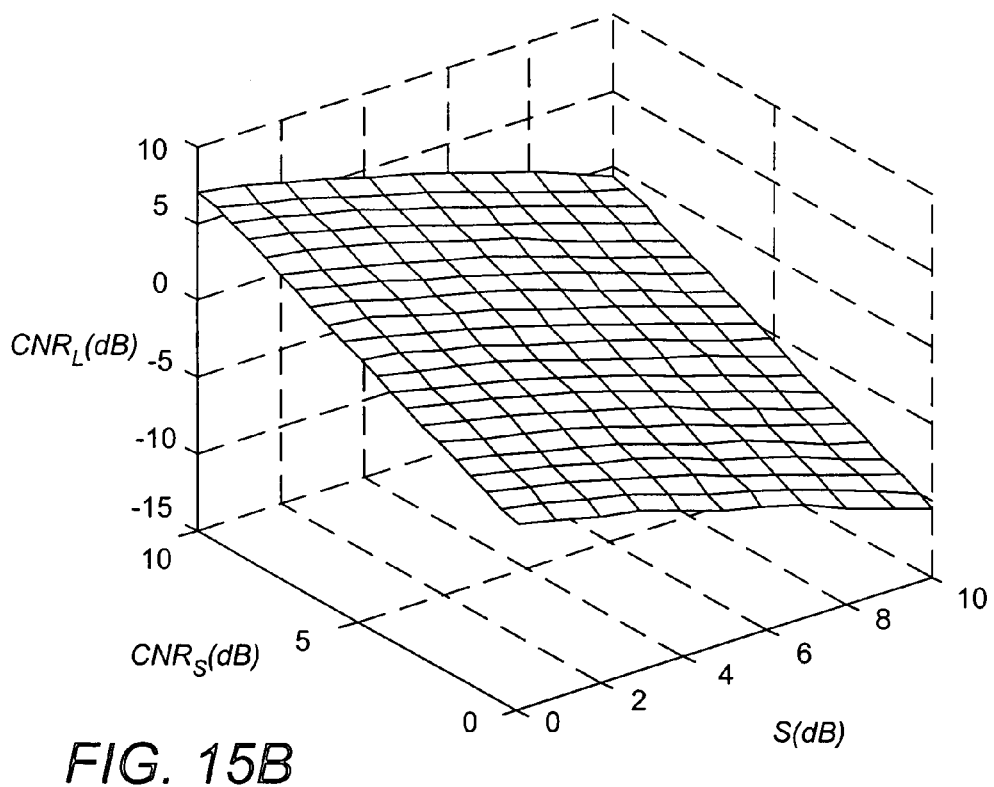

FIG. 15A is a plot of the functional relationship described in Equation (1), visually depicting how the upper layer CNR ($CNR_U$) varies with the system CNR ($CNR_S$) and the power separation S. Similarly, FIG. 15SB is a plot of the functional relationship described in Equation (2), visually depicting how the lower layer CNR ($CNR_L$) varies with the system CNR ($CNR_S$) and the power separation S.

If the upper layer and lower layer CNRs are to be equal ($CNR_U = CNR_L$), then $$10\log_{10} \frac{10^{\frac{(CNR_S+S)}{10}}}{1 + 10^{\frac{S}{10}} + 10^{\frac{CNR_S}{10}}} = 10\log_{10} \frac{10^{\frac{CNR_S}{10}}}{1 + 10^{\frac{S}{10}}}. \quad \text{Equation (3)}$$

The solution to Equation (3) is a line formed at the intersection of the two planes formed by Equation (1) and Equation (2). This result is visually depicted in FIG. 16, and can be determined using techniques well known in the art, thus identifying a relationship between $CNR_S$, S, and $CNR_U = CNR_L$. These foregoing relationships can be used to define an optimal system.

Figure 17:
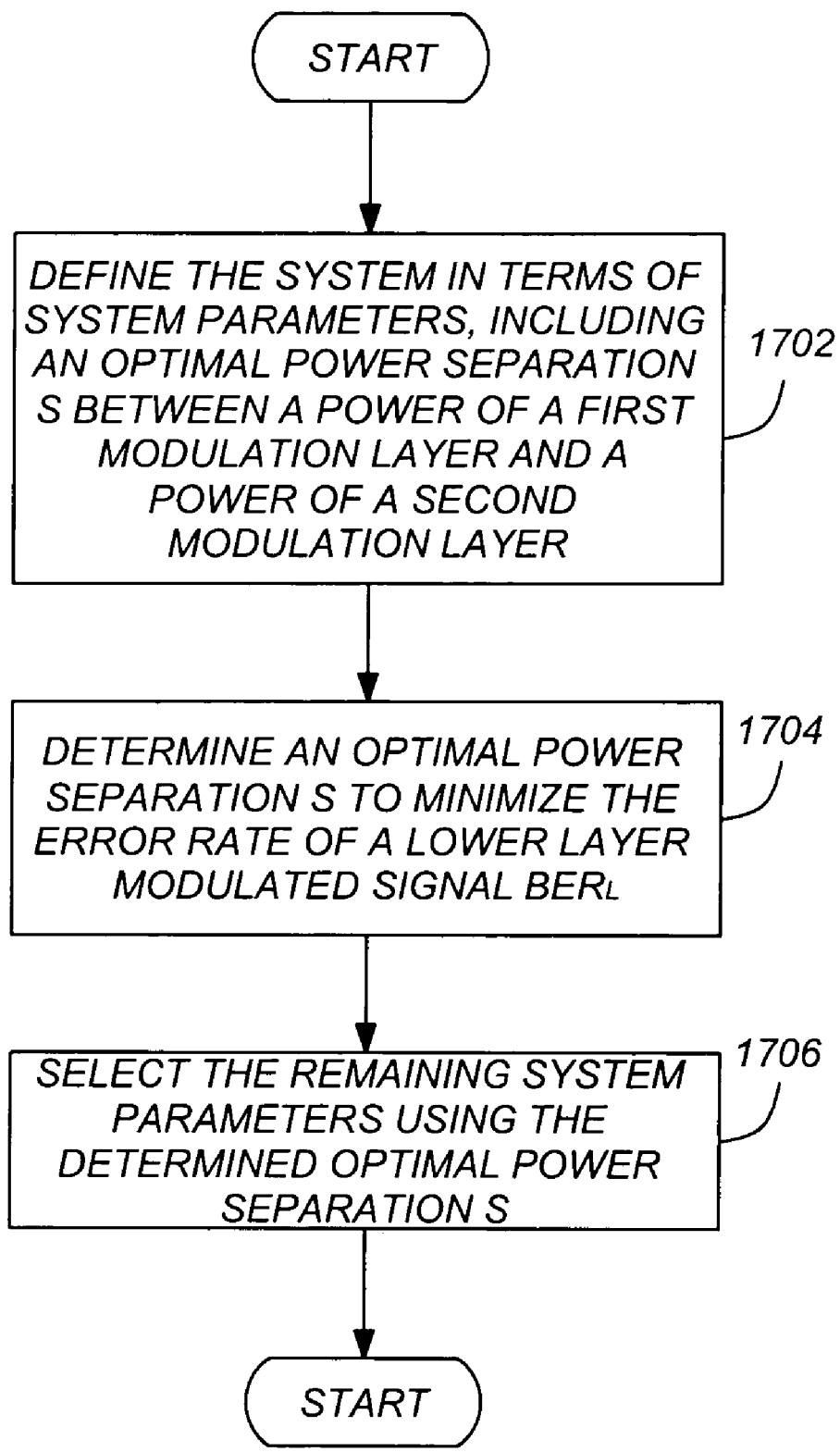
FIG. 17 is a flow chart depicting an exemplary embodiment of a technique to define an optimal system.

FIG. 17 is a flow chart depicting an exemplary embodiment of a technique to define an optimal system. First, the system is defined in terms of a plurality of system parameters, including the power separation S discussed above. This is shown in block 1702. Other system parameters can include $CNR_S$, $CNR_U$, $CNR_L$, $BER_U$, and $BER_L$. As shown in block 1704, an optimal power separation S, selected to minimize the error rate of the lower modulation layer $BER_L$. This can be accomplished by generating a description of the relationship between S, $CNR_S$, and $BER_L$. For example, FIG. 13 shows 3-dimensional surface describing a relationship between S, $CNR_S$, and $BER_L$. The power separation S can be selected at a point where $BER_L$ is minimized (e.g. S between 4.5 and 5 dB and $CNR_S$ greater than 10 dB). Then, the remaining system parameters are determined using the optimal power separation value S.

If the same modulation technique and coding scheme is used for the upper and lower layers, the foregoing result can be further refined using a relationship between the coding scheme/rate, BER, and CNR of the layers.

Figure 18:
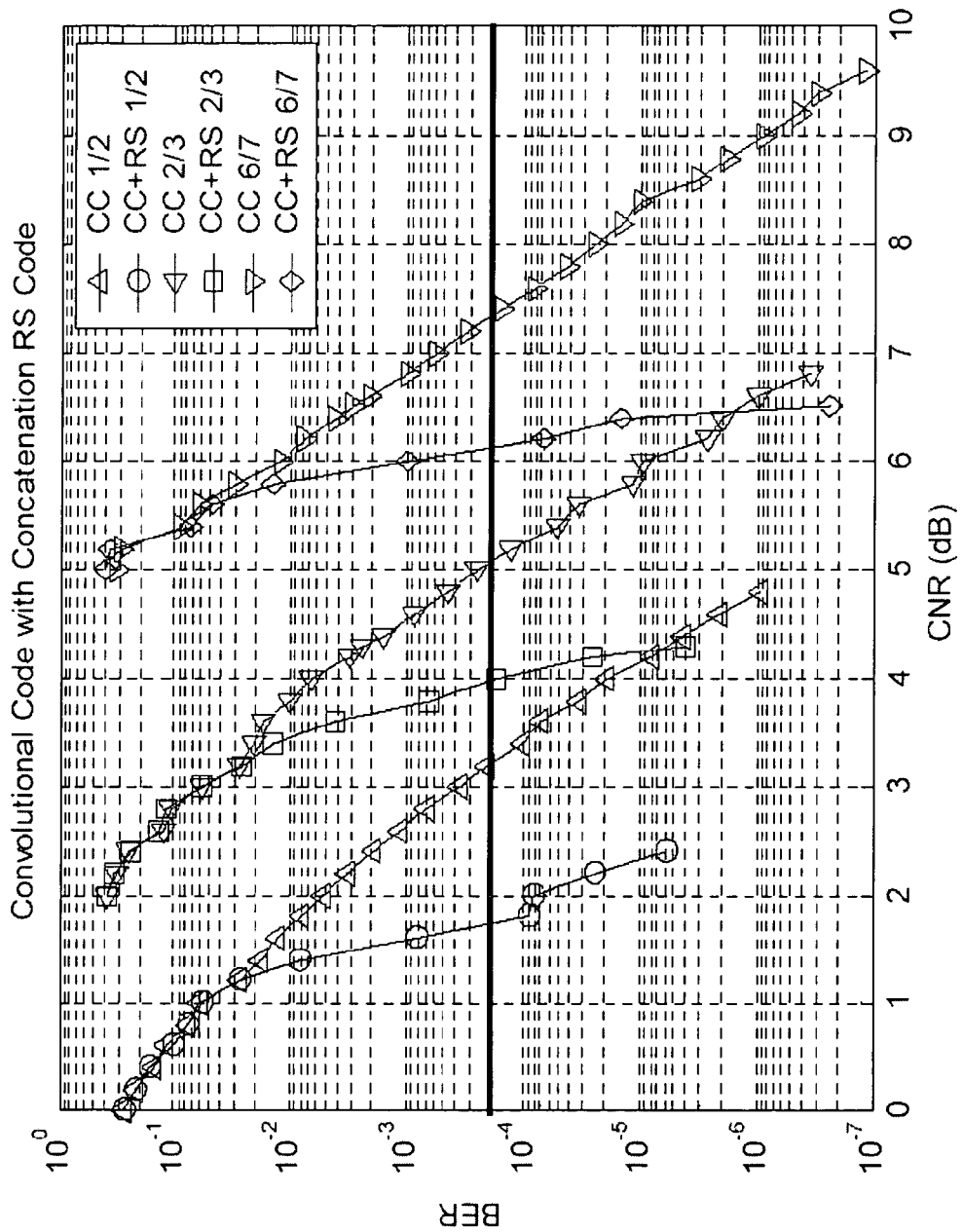
FIG. 18 is a plot showing an exemplary relationship between BER, CNR, and coding scheme/rate.
Figure 19:
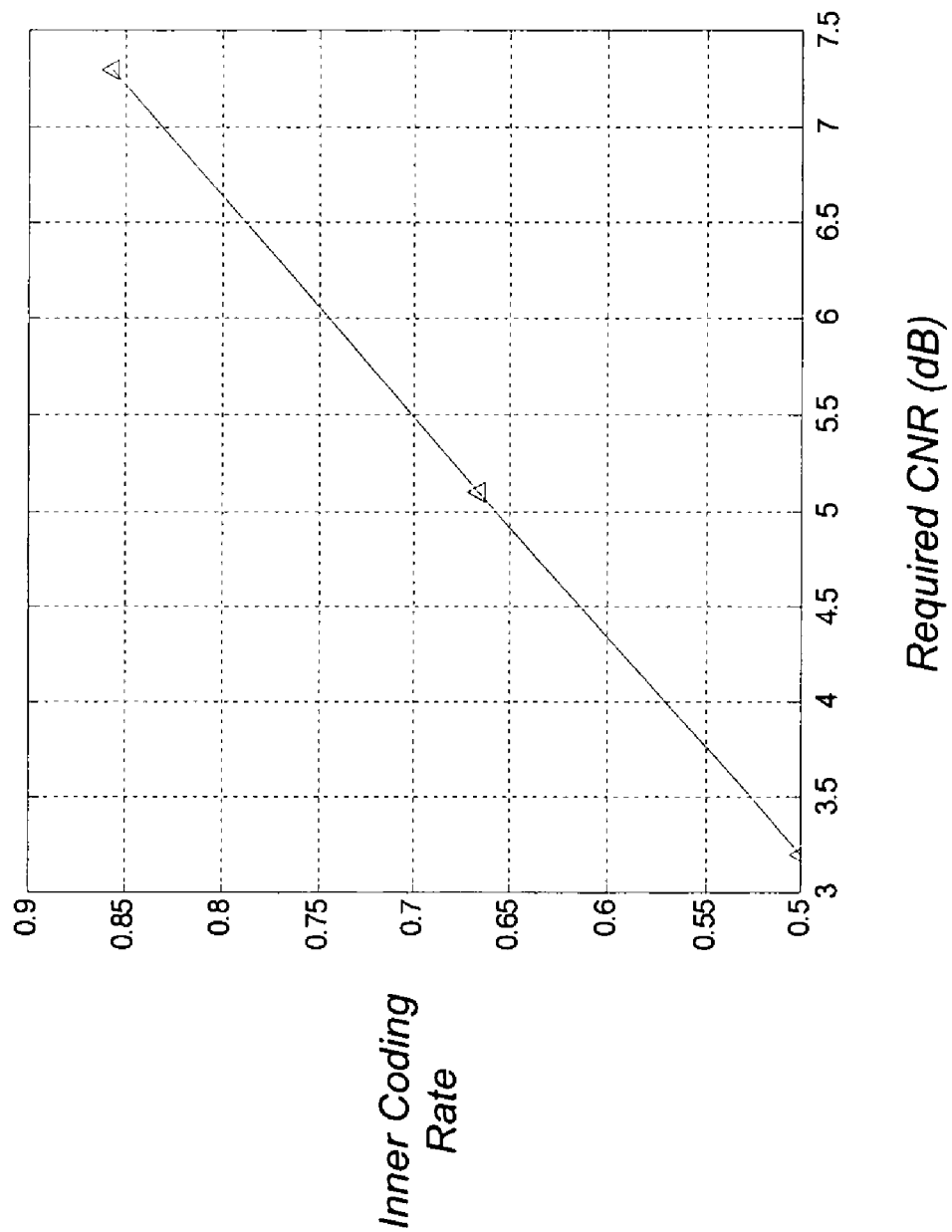
FIG. 19 is a plot of the relationship shown in FIG. 18, plotted for a particular BER value.

FIG. 18 is a plot showing an exemplary relationship between BER, CNR, and coding scheme/rate. If the system design goal is to define a system having layers meeting a quasi-free error (QEF) capability, the layer CNR required to achieve the QEF standard can be determined. In the illustrated example, coding rate/scheme and CNR combinations achieving the QEF standard ($BER \leq 2 \times 10^{-4}$ at the input to a [204,188] Reed-Solomon code) are determined. From this result, a relationship between the coding rate and the single layer CNR required to achieve the coding rate is established. An example of this relationship is shown in FIG. 18. In FIG. 18, BER performances for various FEC code combinations are plotted. CC ½, CC ⅔ and CC 6/7 refer to exemplary convolutional code rates of ½, ⅔, and 6/7, respectively. CC+RS ½CC+RS ⅔ and CC+RS 6/7 include a Reed Solomon code in addition to the respective convolutional codes. For example, the plot shown in FIG. 18 indicates that to achieve a BER of $2 \times 10^{-4}$ with a coding rate of ½, the CNR must be approximately 3.1 dB. This result is also shown in FIG. 19 as the first data point. Using a plot similar to that which is shown in FIGS. 18 and 19, the CNR and coding rate/scheme of the upper layer, ($CNR_U$ and $C_{UL}$, respectively) and the CNR and coding rate/scheme of the lower layer, ($CNR_L$ and $C_{LL}$, respectively) can be determined. Hence, operation illustrated in block 1706 of selecting the remaining system parameters using the determined optimal power separation S, can be accomplished by determining the required CNR for the upper and lower layers ($CNR_U$, $CNR_L$) from a relationship between the upper coding rate CUL and $CNR_U$ and a relationship between the lower coding rate $C_{LL}$ and $CNR_L$, and in using these values of $CNR_U$, $CNR_L$ along with the required $BER_L$ value to determine S, and $CNR_S$.

Figure 16:
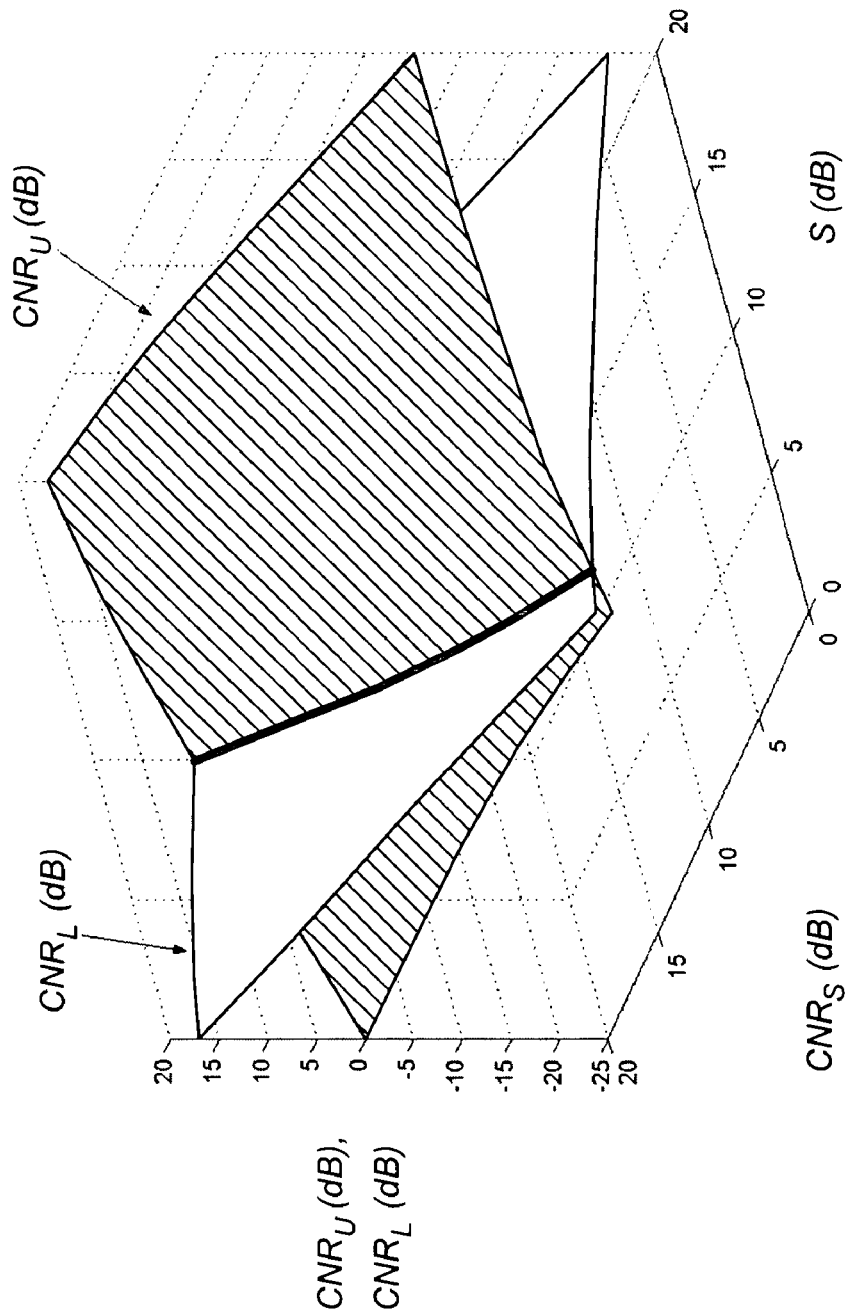
FIG. 16 is a plot showing the intersection of the surfaces shown in FIGS. 15A and 15B.

As shown in FIG. 16, where the upper layer and lower layer CNRs are equal ($CNR_U = CNR_L$), a simple relationship between $CNR_S$, S, and $CNR_U = CNR_L$ is described from Equation (3). In this instance, the system parameters $CNR_S$ and S can be defined from the value of $CNR_U = CNR_L$, which was obtained from the relationship shown in FIGS. 18 and 19.

In some cases, one of the modulation layers may be an existing or legacy modulation layer, used by number of transmitters and receivers. Because modulation and/or coding schemes are subject to improvement over time with the development of new technologies, it may be desirable design a system wherein the modulation and/or coding schemes are different from layer to layer. For example, many legacy receivers use a concatenation of a convolutional code and a Reed-Solomon code. However, it has been determined that the concatenation of a turbo code with a Reed-Solomon code is superior to a legacy concatenation. It is therefore desirable to design an optimized system that can use different coding schemes for the different layers.

The technique described above can also be used to design optimal systems where the coding rates of the upper and lower layers are not the same ($C_{UL} \neq C_{LL}$).

Figure 20:
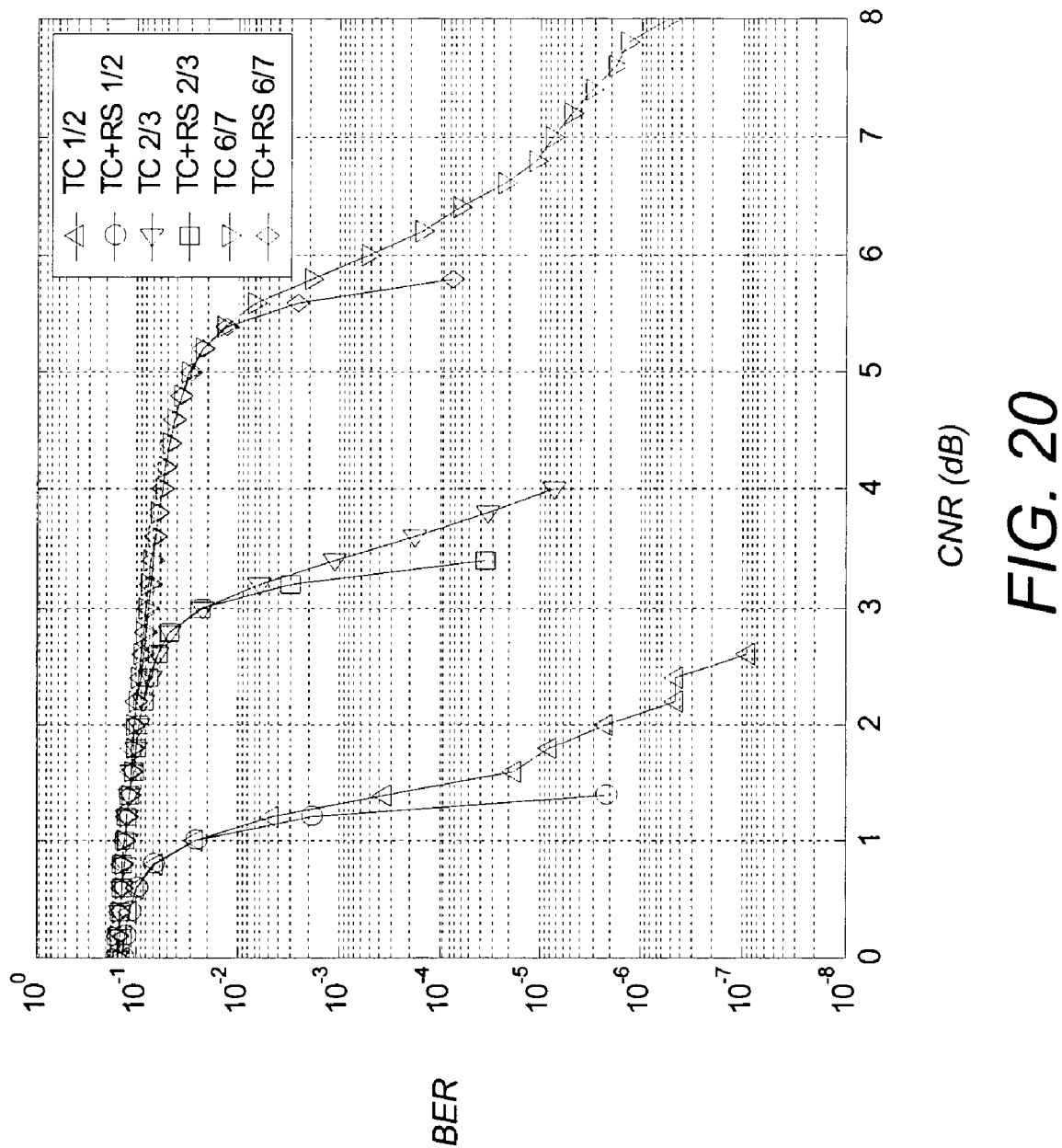
FIGS. 20 and 21 are diagrams illustrating a relationship between BER, CNR (dB), and different coding rates and coding scheme combinations for a single layer QPSK modulation with a turbo code and Reed-Solomon concatenated coding scheme.
Figure 21:
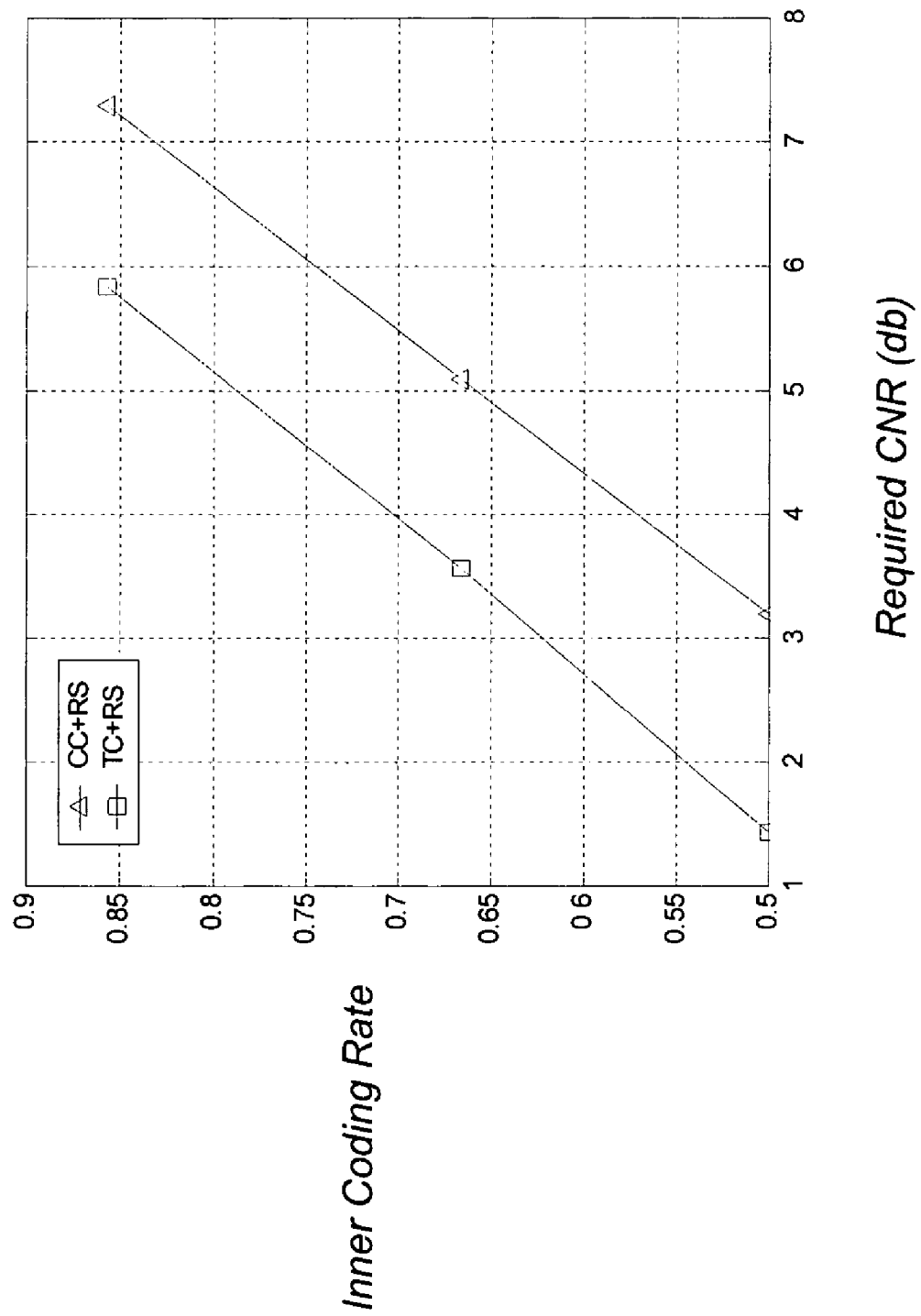

FIG. 20 is a diagram illustrating a relationship between BER, CNR (dB), and different coding rates and coding scheme combinations for a single layer QPSK modulation with a turbo code and Reed-Solomon concatenated coding scheme. In FIG. 20, TC ½, TC ⅔ and TC 6/7 refer to exemplary turbo code rates of ½, ⅔, and 6/7, respectively. TC+RS ½, TC+RS ⅔ and TC+RS 6/7 include a Reed Solomon code in addition to the respective turbo codes. These results, evaluated at the QEF ($BER \leq 2 \times 10^{-4}$) standard, are also presented in FIG. 21. This plot provides a comparison of the convolutional code concatenated with the Reed-Solomon code (CC+RS) and the turbo code concatenated with the Reed-Solomon code (TC+RS) for different coding rates. This plot also provides a relationship between the required CNR of the channel and the coding rate for both coding schemes. If the CNR for both layers is equal ($CNR_U=CNR_L$), the coding rate and coding technique for each layer can be defined to achieve the required BER, and the remaining system parameters $CNR_S$ and S can be defined from the value of $CNR_U=CNR_L$, which was obtained from the relationship shown in FIG. 18.

In the above discussion, it has been assumed that each layer is an independent process, or if they are not independent, that each of the layers have equivalent priorities. In layered modulation schemes, however, one layer is typically a higher priority than other layers, as that layer must be successfully demodulated before the other layers can be demodulated as well. For example, in the two layer system previously described, the upper layer is a higher priority layer, as the demodulation of the upper, or dominant layer, must take place or the lower layer cannot be demodulated.

In design practice, the quantitative priority assignment is determined from system requirements. For example, a system requirement can be such that the upper layer demodulation bit error rate, $BER_U$, be a certain ratio of the lower layer modulation bit error rate, $BER_L$ (in other words, $BER_U=\gamma BER_L$, wherein $\gamma<1$). The parameter "upper layer compensation" or $\beta$, can be defined to describe the extra CNR required by the upper layer in order to achieve the reduced bit error rate. In other words, an increased upper layer CNR ($CNR^*_U$), can be defined such that $CNR^*_U=CNR_U+\beta$, wherein $\beta>0$ and is expressed in dB. The value of $\beta$ required to achieve the decreased bit error rate is determined at least in part from a relationship between $\beta$ and parameters including $CNR_U$ and $\gamma$, as discussed below.

Figure 22:
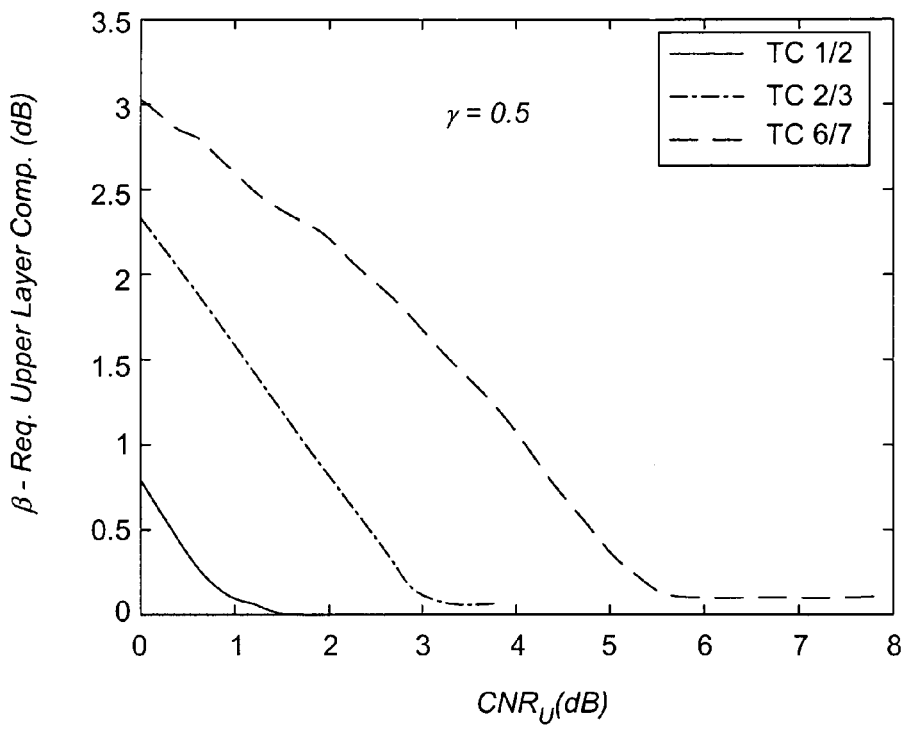
FIGS. 22 and 23 are diagrams showing an exemplary relationship between β and a set of system parameters including $CNR_U$, γ, and $C_{UL}$.
Figure 23:
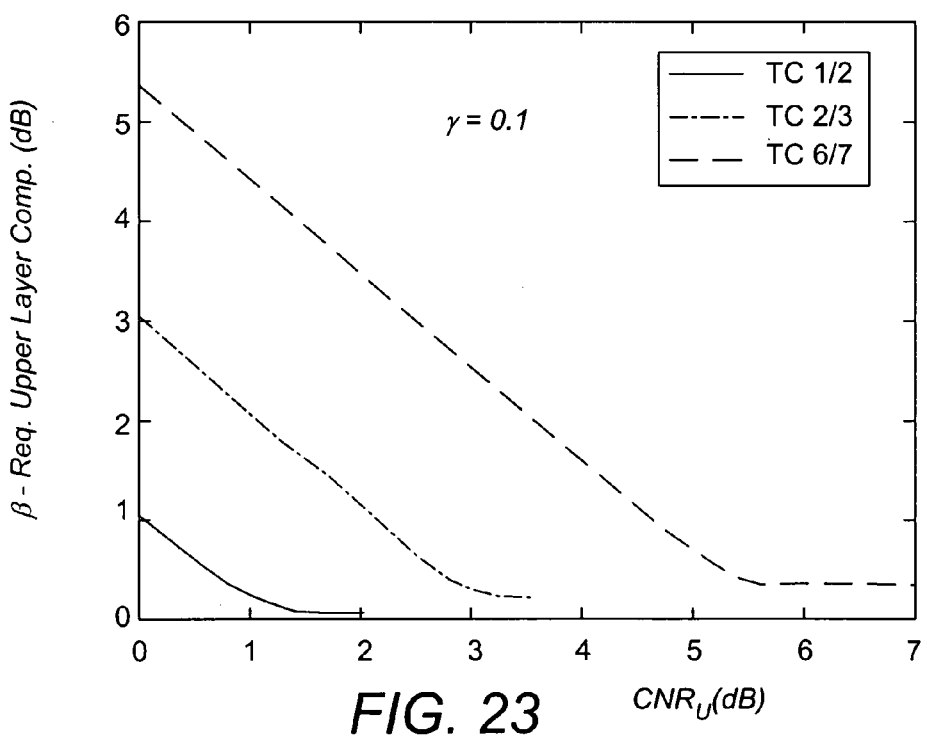

FIGS. 22 and 23 are diagrams showing an exemplary relationship between $\beta$ and a set of system parameters including $CNR_U$, $\gamma$, and $C_{UL}$. FIG. 22 illustrates a case where $BER_U$ is half of $BER_U$ (e.g. where $\gamma=0.5$), and shows a relationship between the upper layer compensation, $\beta$, and the upper layer CNR, $CNR_U$, for different coding rates (e.g. ½, ⅔, and 6/7). Similarly, FIG. 23 illustrates a case where $BER_U$ is one-tenth of $BER_U$ (e.g. where $\gamma=0.1$). From these relationships, an appropriate value for $\beta$ may be found. Considering the upper layer compensation $\beta$, the relationship between the upper and lower layers previously defined can be modified from $CNR_U=CNR_L$ to $CNR_U=CNR_L+\beta$. Using this relation, a modified relationship between $CNR_U$ and $CNR_L$ can be defined for a particular value of $\beta$.

Figure 24:
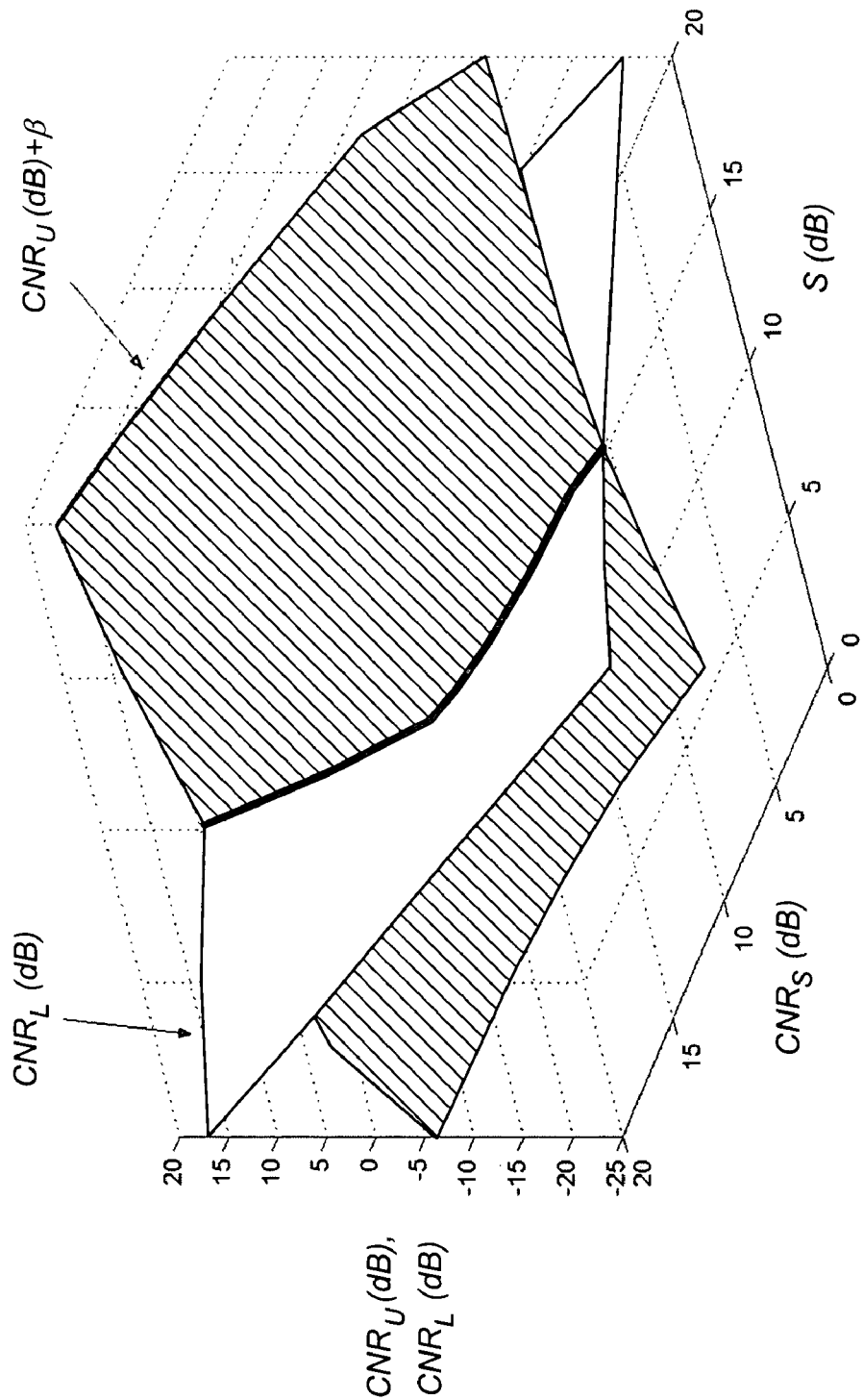
FIG. 24 is a diagram illustrating a relationship between $CNR_U$ and $CNR_L$, as modified to consider the upper layer compensation β.

FIG. 24 is a diagram illustrating a relationship between $CNR_U$ and $CNR_L$, as modified to consider the upper layer compensation $\beta$. Note that the surface describing $CNR_L$ has not changed, but the surface describing $CNR_U$ is displaced upwards. Thus, the line describing the curve $CNR_U=CNR_L+\beta$ is likewise modified from the example presented in FIG. 16, and can be expressed as described in Equation (4) below:

$$10\log_{10}\frac{10^{\frac{(CNR_S+S)}{10}}}{1+10^{\frac{S}{10}}+10^{\frac{CNR_S}{10}}} = 10\log_{10}\frac{10^{\frac{CNR_S}{10}}}{1+10^{\frac{S}{10}}} + \beta. \quad \text{Equation (4)}$$

Hardware Environment

Figure 25:
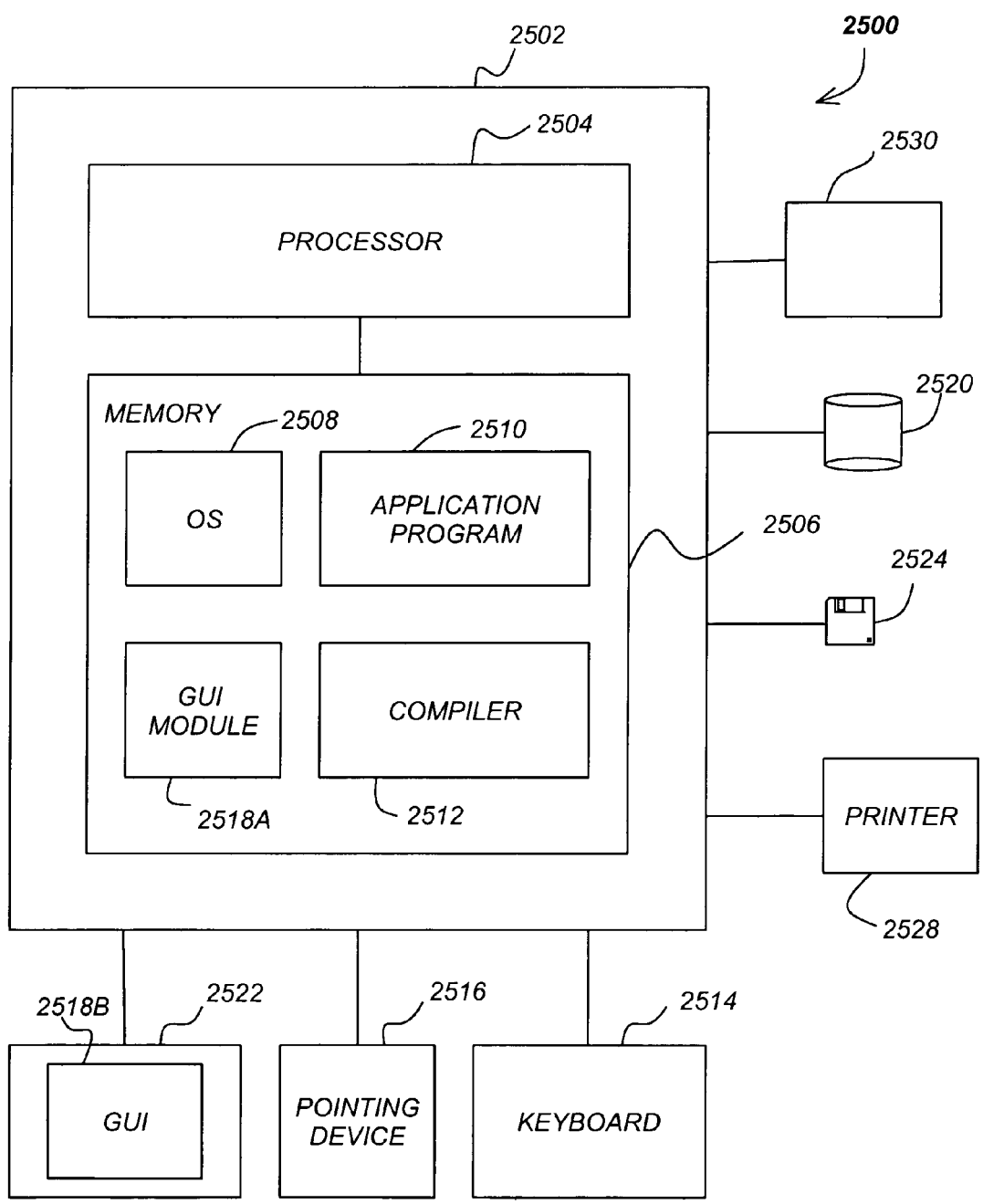
FIG. 25 illustrates an exemplary computer system that could be used to practice the present invention.

FIG. 25 illustrates an exemplary computer system 2500 that could be used to implement selected modules or functions the present invention. The computer 2502 comprises a processor 2504 and a memory, such as random access memory (RAM) 2506. The computer 2502 is operatively coupled to a display 2522, which presents images such as windows to the user on a graphical user interface 2518B. The computer 2502 may be coupled to other devices, such as a keyboard 2514, a mouse device 2516, a printer, etc. Of course, those skilled in the art will recognize that any combination of the above components, or any number of different components, peripherals, and other devices, may be used with the computer 2502.

Generally, the computer 2502 operates under control of an operating system 2508 stored in the memory 2506, and interfaces with the user to accept inputs and commands and to present results through a graphical user interface (GUI) module 2518A. Although the GUI module 2518A is depicted as a separate module, the instructions performing the GUI functions can be resident or distributed in the operating system 2508, the computer program 2510, or implemented with special purpose memory and processors. The computer 2502 also implements a compiler 2512 which allows an application program 2510 written in a programming language such as COBOL, C++, FORTRAN, or other language to be translated into processor 2504 readable code. After completion, the application 2510 accesses and manipulates data stored in the memory 2506 of the computer 2502 using the relationships and logic that was generated using the compiler 2512. The computer 2502 also optionally comprises an external communication device such as a modem, satellite link, Ethernet card, or other device for communicating with other computers.

In one embodiment, instructions implementing the operating system 2508, the computer program 2510, and the compiler 2512 are tangibly embodied in a computer-readable medium, e.g., data storage device 2520, which could include one or more fixed or removable data storage devices, such as a zip drive, floppy disc drive 2524, hard drive, CD-ROM drive, tape drive, etc. Further, the operating system 2508 and the computer program 2510 are comprised of instructions which, when read and executed by the computer 2502, causes the computer 2502 to perform the steps necessary to implement and/or use the present invention. Computer program 2510 and/or operating instructions may also be tangibly embodied in memory 2506 and/or data communications devices 2530, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, it is noted that the uplink configurations depicted and described in the foregoing disclosure can be implemented by one or more hardware modules, one or more software modules defining instructions performed by a processor, or a combination of both. Further, although the foregoing discussion addressed the optimization of a two-layer modulation system, the aforementioned techniques are equally applicable in modulation systems using 3, 4, or any arbitrary number of layers.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of optimizing a system for transmitting a layered modulated signal, comprising the steps of:
   defining the system in terms of a set of system parameters, including an optimal power separation S between a power of a first modulation layer and a power of a second modulation layer and a required system carrier-to-noise ratio ($CNR_S$);
   determining an optimal power separation S to minimize an error rate of a lower layer modulated signal $BER_L$; and
   selecting remaining system parameters in the set of system parameters using the determined optimal power separation S.

2. The method of claim 1, wherein:
   the layered modulation signal comprises an upper layer signal and a lower layer signal, and
   the step of selecting the remaining system parameters using the determined optimal power separation $P_x$ comprises the steps of:
      determining a required CNR for the upper layer ($CNR_U$) and a required CNR for the lower layer ($CNR_L$) from a relationship between an upper layer coding rate $C_{UL}$ and $CNR_U$, and a lower level coding rate $C_{LL}$ and $CNR_L$; and
      determining a required system CNR ($CNR_s$) from $CNR_U$, $CNR_L$, and S.

3. The method of claim 2, wherein the required $CNR_s$ is determined at least in part from the relations:

$$CNR_U = 10\log_{10} \frac{10^{\frac{(CNR_S+S)}{10}}}{1+10^{\frac{S}{10}}+10^{-\frac{CNR_S}{10}}};$$

and $$CNR_L = 10\log_{10} \frac{10^{CNR_S}}{1+10^{\frac{S}{10}}},$$

wherein ($CNR_s$) from $CNR_U$, $CNR_L$, and S are expressed in decibels.

4. The method of claim 2, wherein $C_{UL}=C_{LL}$.

5. The method of claim 2, wherein $C_{UL} \neq C_{LL}$ and wherein the step of determining a required system CNR ($CNR_s$) from $CNR_U$, $CNR_L$, and $P_x$, comprises the steps of:
   selecting a value for $CNR_U$ and a value for $CNR_L$; and
   determining the required $CNR_s$ from a relationship between $CNR_s$ and $CNR_U$, $CNR_L$, and S.

6. The method of claim 5, wherein the required $CNR_s$ is determined at least in part from the relation:

$$10\log_{10} \frac{10^{\frac{(CNR_S+S)}{10}}}{1+10^{\frac{S}{10}}+10^{-\frac{CNR_S}{10}}} = 10\log_{10} \frac{10^{\frac{CNR_S}{10}}}{1+10^{\frac{S}{10}}}.$$

7. The method of claim 1, wherein the error rate of a upper layer modulated signal $BER_U = \gamma BER_L$, wherein $\gamma < 1$, and wherein:
   the method further comprises the step of determining an upper layer CNR compensation $\beta$ required to produce an upper layer modulated signal error rate $BER_U$ defined at least in part by the relationship $CNR^*_U = CNR_U + \beta$; and
   the step of selecting the remaining system parameters using the determined optimal power separation S comprises the steps of:
      determining the required system CNR, $CNR_s$, at least in part from the determined optimal power separation, S, and a relation $$10\log_{10} \frac{10^{\frac{(CNR_S+S)}{10}}}{1+10^{\frac{S}{10}}+10^{-\frac{CNR_S}{10}}} = 10\log_{10} \frac{10^{\frac{CNR_S}{10}}}{1+10^{\frac{S}{10}}} + \beta.$$

8. The method of claim 7, wherein the upper layer CNR compensation $\beta$ is determined at least in part from a relationship between $\beta$ and parameters including $CNR_U$ and $\gamma$.

9. The method of claim 8, wherein $\beta$ is determined at least in part from a relationship between $\beta$ and parameters further including $C_{UL}$.

10. The apparatus of claim 7, wherein the upper layer CNR compensation $\beta$ is determined at least in part from a relationship between $\beta$ and parameters including $CNR_U$ and $\gamma$.

11. The apparatus of claim 8, wherein $\beta$ is determined at least in part from a relationship between $\beta$ and parameters further including $C_{UL}$.

12. An apparatus for optimizing a system for transmitting a layered modulated signal, comprising:
   means for defining the system in terms of system parameters, including an optimal power separation S between a power of a first modulation layer and a power of a second modulation layer and a required system carrier-to-noise ratio ($CNR_S$);
   means for determining an optimal power separation S to minimize an error rate of a lower layer modulated signal $BER_L$; and
   means for selecting remaining system parameters using the determined optimal power separation S.

13. The apparatus of claim 12, wherein:
   the layered modulation signal comprises an upper layer signal and a lower layer signal, and
   the means for selecting the remaining system parameters using the determined optimal power separation $P_x$ comprises:
      means for determining a required CNR for the upper layer ($CNR_U$) and a required CNR for the lower layer ($CNR_L$) from a relationship between an upper layer coding rate $C_{UL}$ and $CNR_U$, and a lower level coding rate $C_{LL}$ and $CNR_L$; and means for determining a required system CNR ($CNR_s$) from $CNR_U$, $CNR_L$, and S.

14. The apparatus of claim 13, wherein the required $CNR_s$ is determined at least in part from the relations:

$$CNR_U = 10\log_{10} \frac{10^{\frac{(CNR_s+S)}{10}}}{1+10^{\frac{S}{10}}+10^{\frac{CNR_s}{10}}};$$

and $$CNR_L = 10\log_{10} \frac{10^{\frac{CNR_s}{10}}}{1+10^{\frac{S}{10}}},$$

wherein ($CNR_s$) from $CNR_U$, $CNR_L$, and S are expressed in decibels.

15. The apparatus of claim 13, wherein $C_{UL}=C_{LL}$.

16. The apparatus of claim 13, wherein $C_{UL} \neq C_{LL}$ and wherein the means for determining a required system CNR ($CNR_s$) from $CNR_U$, $CNR_L$, and $P_x$, comprises:

means for selecting a value for $CNR_U$ and a value for $CNR_L$; and means for determining the required $CNR_s$ from a relationship between $CNR_s$ and $CNR_U$, $CNR_L$, and S.

17. The apparatus of claim 13, wherein the required $CNR_s$ is determined at least in part from the relation:

$$10\log_{10} \frac{10^{\frac{(CNR_s+S)}{10}}}{1+10^{\frac{S}{10}}+10^{\frac{CNR_s}{10}}} = 10\log_{10} \frac{10^{\frac{CNR_s}{10}}}{1+10^{\frac{S}{10}}}.$$

18. The apparatus of claim 12, wherein the error rate of a upper layer modulated signal $BER_U=\gamma BER_L$, wherein $\gamma<1$, and wherein:

the apparatus further comprises means for determining an upper layer CNR compensation $\beta$ required to produce an upper layer modulated signal error rate $BER_U$ defined at least in part by the relationship $CNR^*_U=CNR_U+\beta$; and the means for selecting the remaining system parameters using the determined optimal power separation S comprises:

means for determining the required system CNR, $CNR_s$, at least in part from the determined optimal power separation, S, and a relation $$10\log_{10} \frac{10^{\frac{(CNR_s+S)}{10}}}{1+10^{\frac{S}{10}}+10^{\frac{CNR_s}{10}}} = 10\log_{10} \frac{10^{\frac{CNR_s}{10}}}{1+10^{\frac{S}{10}}} + \beta.$$

19. An system for transmitting a layered modulation signal characterized by a CNR of $CNR_s$ having an upper layer signal characterized and a lower layer signal, wherein a power of the upper layer signal is separated by a power of the lower layer signal by a power separation S, the apparatus defined by performing the steps of:

defining the system in terms of a set of system parameters, including an optimal power separation S between a power of a first modulation layer and a power of a second modulation layer and a required system carrier-to-noise ratio ($CNR_S$);

determining an optimal power separation S to minimize an error rate of a lower layer modulated signal $BER_L$; and selecting remaining system parameters in the set of system parameters using the determined optimal power separation S.

* * * * *